(12) United States Patent
Vowles et al.

(10) Patent No.: US 7,737,568 B2
(45) Date of Patent: Jun. 15, 2010

(54) WAVE ENERGY DEVICE

(75) Inventors: Alan Vowles, Flin Flon (CA); Brian Kurczaba, Winnipeg (CA); Heather Acres, Flin Flon (CA)

(73) Assignee: Wave Energy Technologies Inc., Winnipeg, Manitoba (CA)

( * ) Notice: Subject to any disclaimer, the term of this patent is extended or adjusted under 35 U.S.C. 154(b) by 486 days.

(21) Appl. No.: 11/720,346

(22) PCT Filed: Nov. 30, 2005

(86) PCT No.: PCT/CA2005/001808

§ 371 (c)(1),
(2), (4) Date: May 29, 2007

(87) PCT Pub. No.: WO2006/058421

PCT Pub. Date: Jun. 8, 2006

(65) Prior Publication Data

US 2008/0093852 A1    Apr. 24, 2008

Related U.S. Application Data

(60) Provisional application No. 60/632,305, filed on Dec. 2, 2004.

(51) Int. Cl.
 *F03B 13/10* (2006.01)
 *F03B 13/12* (2006.01)
 *H02P 9/04* (2006.01)

(52) U.S. Cl. .......................................... 290/42; 290/53

(58) Field of Classification Search ................... 290/42, 290/53; 60/398, 495, 496, 498, 501; 417/7, 417/331, 330; 405/76

See application file for complete search history.

(56) References Cited

U.S. PATENT DOCUMENTS

| | | | | |
|---|---|---|---|---|
| 3,870,893 A | * | 3/1975 | Mattera | 290/53 |
| 3,983,404 A | * | 9/1976 | Sherrard | 290/53 |
| 3,988,592 A | * | 10/1976 | Porter | 290/53 |
| 4,076,463 A | * | 2/1978 | Welczer | 417/331 |
| 4,741,157 A | * | 5/1988 | Nishikawa | 60/398 |
| 4,754,157 A | * | 6/1988 | Windle | 290/53 |
| 4,843,249 A | * | 6/1989 | Bussiere | 290/53 |
| 4,864,152 A | * | 9/1989 | Pedersen | 290/53 |
| 5,405,250 A | * | 4/1995 | Vowles et al. | 417/331 |
| 6,020,653 A | * | 2/2000 | Woodbridge et al. | 290/53 |
| 6,109,029 A | * | 8/2000 | Vowles et al. | 60/398 |
| 6,109,863 A | | 8/2000 | Milliken | |
| 6,392,314 B1 | | 5/2002 | Dick | |
| 7,199,481 B2 | * | 4/2007 | Hirsch | 290/42 |
| 2004/0251692 A1 | * | 12/2004 | Leijon et al. | 290/42 |

FOREIGN PATENT DOCUMENTS

| | | |
|---|---|---|
| CA | 2289092 | 11/1998 |
| WO | 2005078276 | 8/2005 |

* cited by examiner

*Primary Examiner*—Julio C. Gonzalez
(74) *Attorney, Agent, or Firm*—Ade & Company Inc.; Ryan W. Dupuis; Kyle R. Satterthwaite

(57) ABSTRACT

A wave energy device converts the motion of waves on a body of water into a usable form of energy, for example a flow of pressurized water or an electrical current. The device includes a buoyant body for tracking the rise and fall of the waves and a working surface coupled for movement with the buoyant body and which is designed to capture and convert both heave and surge forces of the waves. The invention also involves a rapid deployment and retrieval capability and a capability to rotate to accommodate changes in wave direction. The device is universally attached to the seafloor, which allows the device to safely pitch, yaw and roll with the wave forces from any direction thereby reducing the likelihood of damage due to extreme weather or marine traffic. The universal attachment also allows the device to automatically adjust for varying water elevation due to tides.

59 Claims, 11 Drawing Sheets

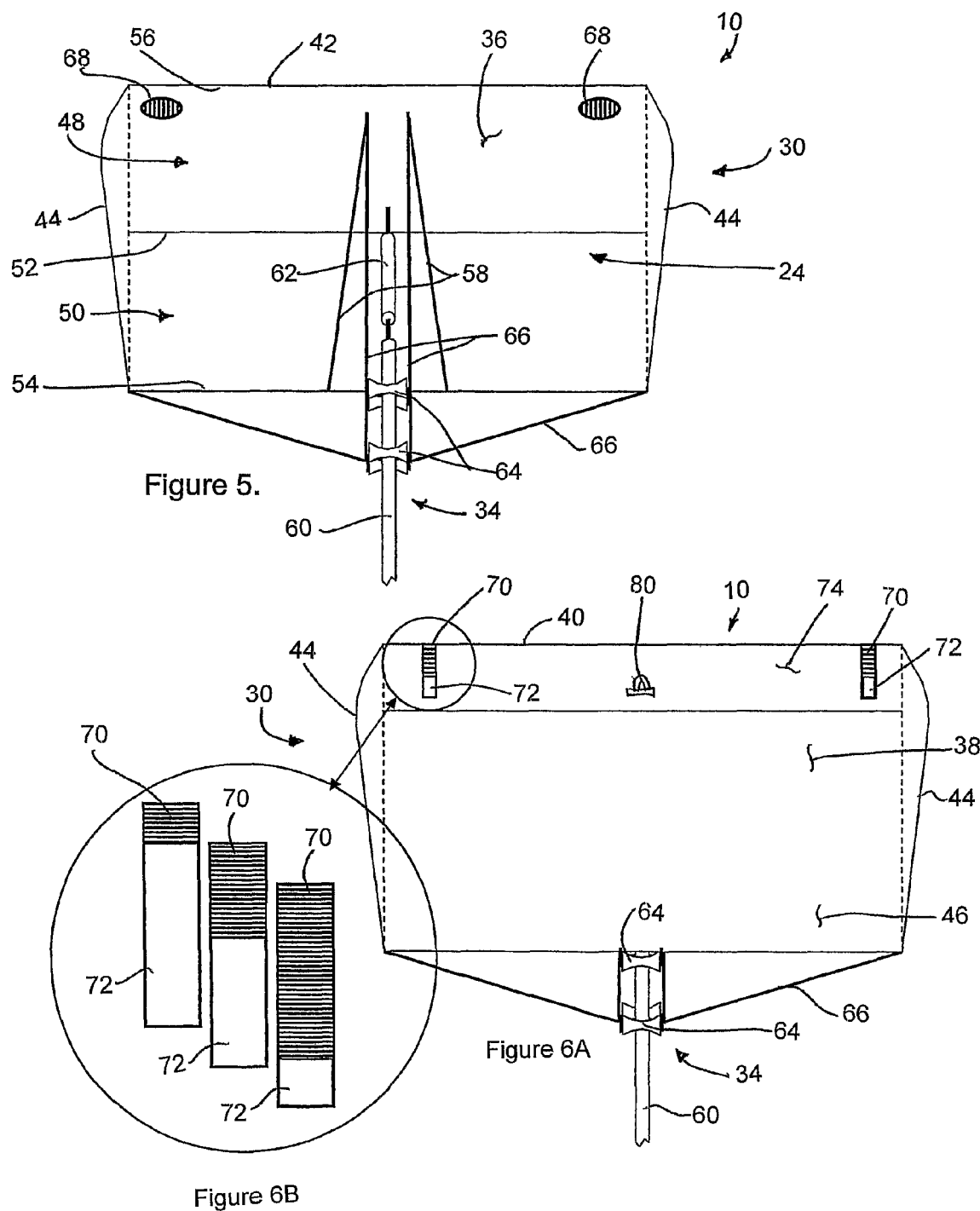

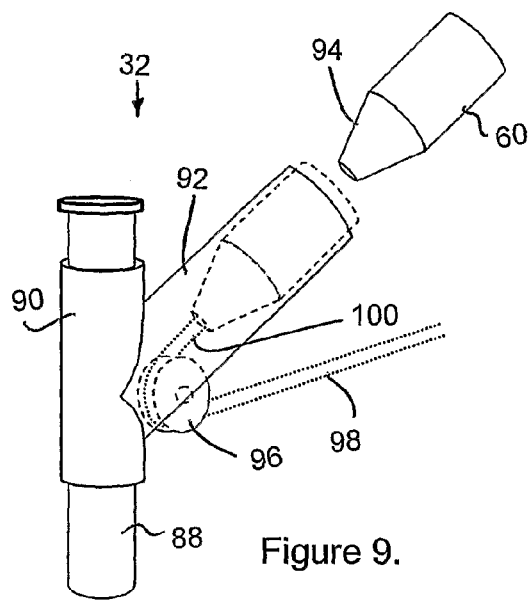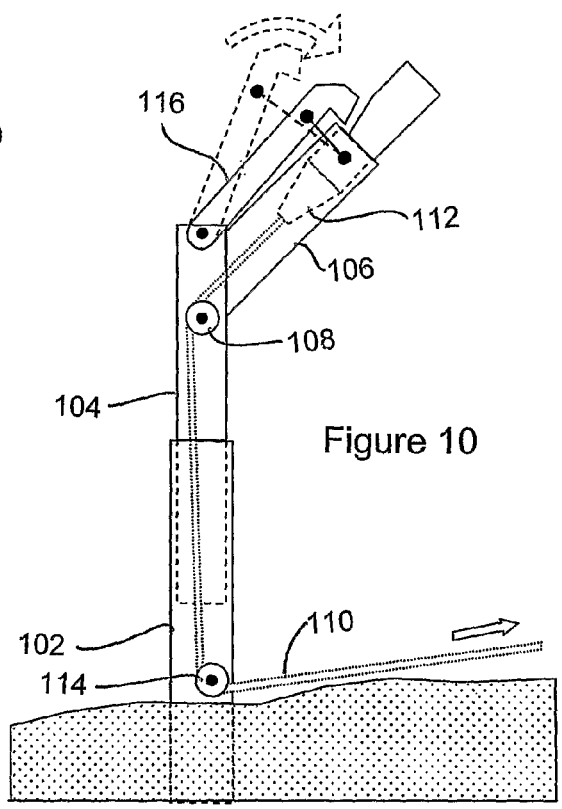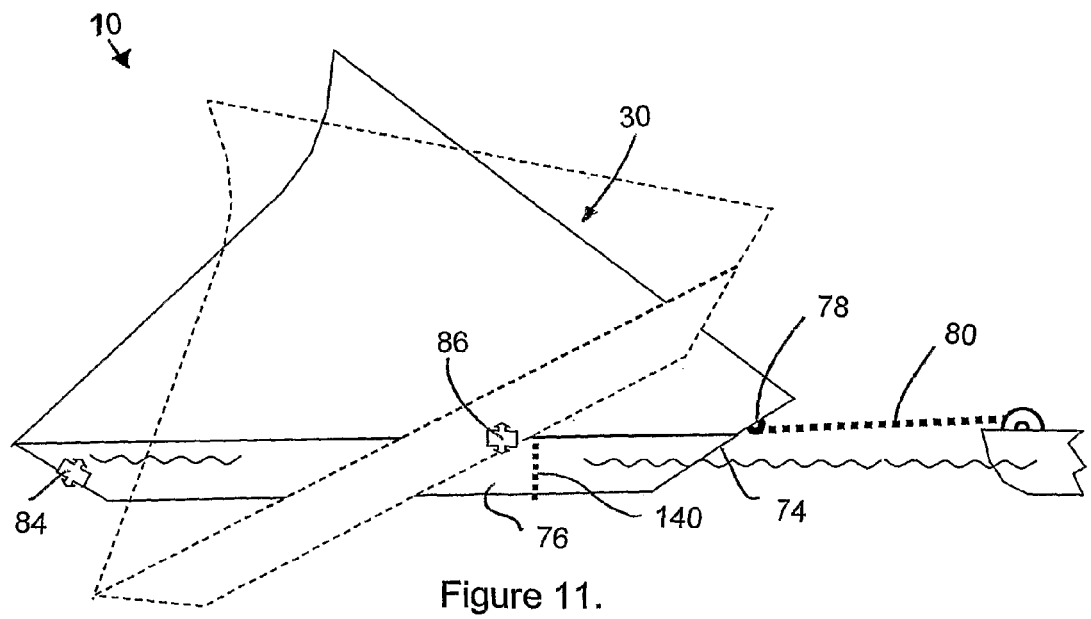
Figure 9.
Figure 10
Figure 11.

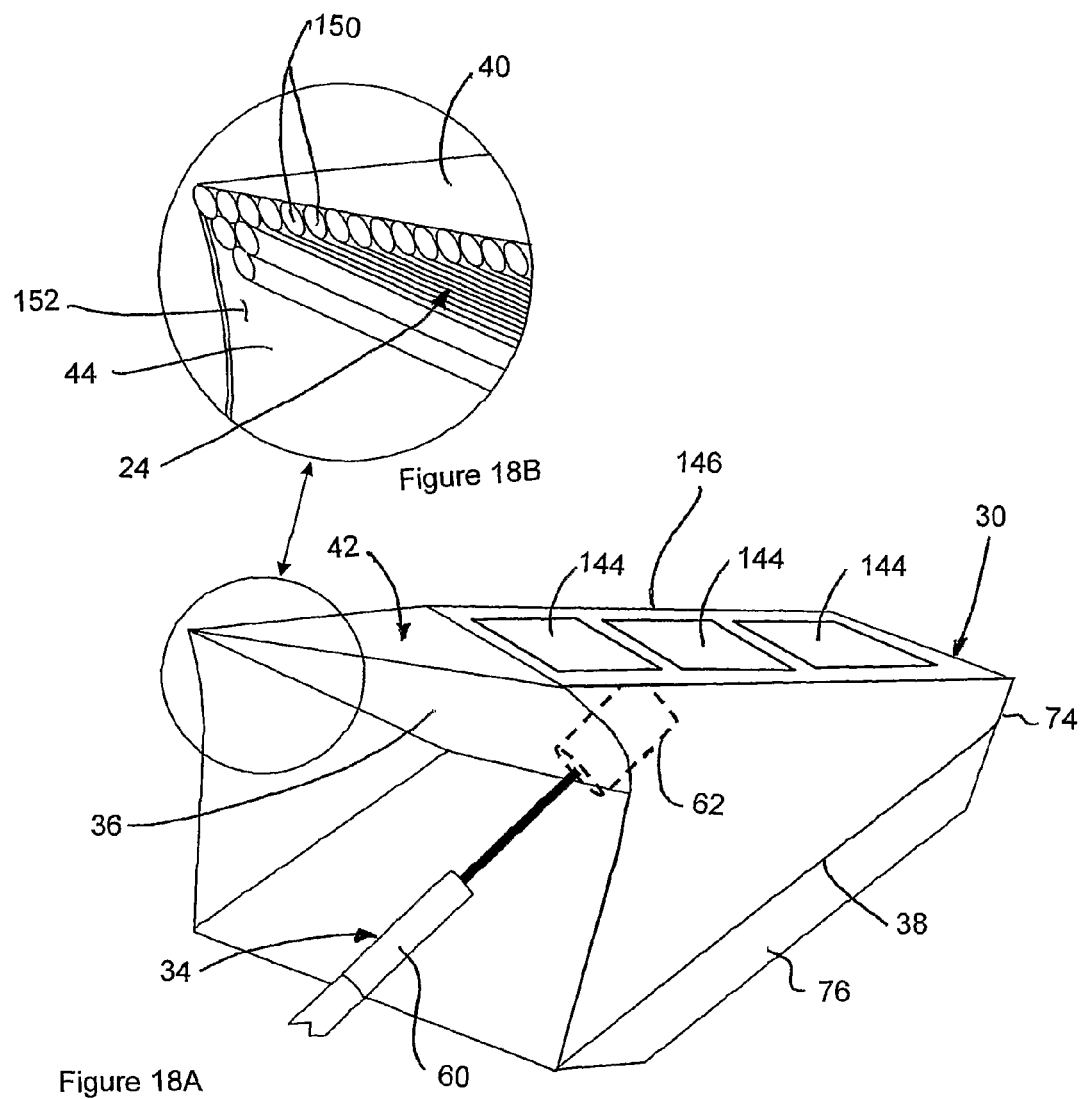

WAVE ENERGY DEVICE

This application is a national phase filing of PCT/CA05/001808 and claims the benefit under 35 U.S.C. 119(e) of U.S. provisional application Ser. No. 60/632,305, filed Dec. 2, 2004.

FIELD OF THE INVENTION

The present invention relates to a wave energy device for capturing wave energy of waves to a substantial depth below the surface of a body of water, and more particularly relates to a device for capturing both heave and surge forces of the waves and converting the energy from the waves to a usable form, for example, a flow of pressurized water for purposes of the production of desalinated water or electric power.

BACKGROUND

The first of many patents for devices proposing to harness the power contained in ocean waves was issued in France in 1799. It was not until the 1970's that any considerable efforts were made to develop a viable and cost-effective technology. This was primarily driven by the increasing concern about the earth's finite fossil fuel resources and about environmental pollution resulting from combustion of such fuels.

There has been much interest in how to derive usable energy from solar, geothermal, wind and wave sources. The latter two offer the prospect of generating electricity and desalinating seawater by directly converting the kinetic energy of wind or waves to a useable form of power.

Ocean waves constitute an enormous reservoir of energy to be exploited. However, their random nature and the hostility of the marine environment have posed significant problems to the practical realization of a cost-effective wave energy conversion technology.

The greatest energy flux occurs in deep water waves that have been generated over uninterrupted fetches of the open ocean. However, the engineering challenges necessary to enable the equipment to survive in that environment have thus far proven to be insurmountable. Another reason is that deep-water structures must float and this reduces the conversion efficiency.

Although incident power reduces with decreasing depth, so do construction, installation and operating costs. It is for this reason that the practical limit appears to be about 20 meters of water depth. However, a viable design for a wave energy converter operating at this depth or any other depth has not yet been demonstrated as commercially viable.

U.S. Pat. Nos. 4,076,463 (Welczer), 4,754,157 (Windle) and 6,800,954 (Meano) describe various examples of wave energy devices providing a float for following the rise and fall of the waves which drives a pump to produce a usable flow of pressurized water. In each instance however, the floats are only able to capture the vertical movement of the water. Accordingly, a substantial portion of the wave energy in the form of surge forces in the direction of wave propagation is lost, resulting in poor operating efficiencies.

Some other prior art devices are known to provide a channel structure which is fixed in relation to the seabed to direct the wave energy towards a float member which similarly drives a pump. The float member in this instance is typically constrained by a pivot arm or a sliding rail structure. The cost of installation of such a configuration is typically prohibitive. Furthermore, the devices can be subject to considerable damage when left open to the elements due to the fixed nature of their installation.

SUMMARY OF THE INVENTION

According to one aspect of the invention there is provided a wave energy device for capturing heave forces and surge forces of waves propagating in a wave direction in which the device faces forwardly to confront the waves propagating in the wave direction, the device comprising:

a buoyant body for tracking a rise and fall of the waves;

a working surface for facing forwardly to confront the waves and being coupled to the buoyant body for movement together therewith, the working surface including an upper portion and a lower portion for capturing a substantial portion of the surge forces in the wave direction and the heave forces of the waves between the upper and lower portions of the working surface;

the lower portion of the working surface extending from an inner end to an outer end in which the outer end of the lower portion is spaced forwardly and downwardly in relation to the inner end of the lower portion;

the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;

an anchor for being substantially anchored against the rise and fall and the surge forces of the waves; and a driven linkage coupling the buoyant body to the anchor for relative movement therebetween and for converting said relative movement into a usable form of energy.

The device includes a buoyant body for tracking the rise and fall of the waves and a working surface coupled for movement with the buoyant body and which is designed to capture and convert both heave and surge forces of the waves for optimum efficiency in capturing wave energy. The shape of the working surface includes a lower portion extending downwardly and forwardly into the oncoming waves enhancing the ability of the device to capture wave energy to a substantial depth below the surface of the waves instead of relying only on buoyancy to drive upward movement of the buoyant body. Weight of the buoyant body or any additional ballast provided increase efficiency by driving the buoyant body downwardly into the troughs between adjacent wave crests.

The upper portion and the lower portion of the working surface preferably comprise a continuous surface in which the upper and lower portions are joined with one another at the respective inner ends at a concave intersection.

The upper portion of the working surface may comprise a planar inclined surface extending upwardly and forwardly from the inner end to the outer end thereof and the lower portion of the working surface may comprise a planar inclined surface extending downwardly and forwardly from the inner end to the outer end thereof.

Furthermore, the upper portion of the working surface and the lower portion of the working surface may be oriented near perpendicular relative to one another with the outer end of the upper portion being substantially in vertical alignment above the outer end of the lower portion. The lower portion of the working surface preferably has a surface area which is near or greater in magnitude than the surface area of the upper portion.

Preferably a pair of upright side panels span between the upper portion and the lower portion horizontally spaced apart from one another at opposing ends of the working surface in which the side panels are spaced apart in a direction which is substantially perpendicular to the wave direction. The side panels may diverge from one another as the side panels extend forwardly from the inner ends to the outer ends of the portions of the working surface for increasing the capture area of the working surface.

The driven linkage preferably comprises a linear driven linkage which couples the buoyant body to the anchor for relative linear sliding movement substantially along a linear axis which is inclined upwardly and rearwardly in the wave direction.

There may be provided a biasing mechanism coupled between the buoyant body and the anchor for biasing the buoyant body towards the anchor.

In a preferred embodiment, the driven linkage comprises a piston rod coupled to the anchor and a housing coupled to the buoyant body for movement together with the buoyant body in which the housing slidably receives the piston rod therein for converting relative movement between the piston rod and the housing into the usable form of energy.

In one embodiment, the piston rod extends through opposing sides of the buoyant body and the piston rod carries the buoyant body for sliding movement therealong. The buoyant body is thus supported from above and from below at opposing ends of the piston rod.

A width of the buoyant body in a horizontal direction perpendicular to the wave direction is preferably plural times a length of the buoyant body in the wave direction. This permits the buoyant body to automatically align itself to face into the oncoming waves when the driven linkage is coupled to the anchor for free pivotal movement about an upright axis.

In one embodiment, the driven linkage is coupled to the anchor for relative sliding movement along an upright axis while maintaining inclination of the longitudinal axis of the driven linkage at an optimum orientation. This relative vertical sliding movement accommodates for varying mean elevations of the buoyant body relative to the seabed due to tidal variations for example.

Alternatively, the driven linkage may be coupled to the anchor for free pivotal movement about a horizontal axis to accommodate for tidal variations.

When the driven linkage has a longitudinal axis extending between the buoyant body and the anchor, the buoyant body is preferably coupled to the anchor for relative pivotal movement about the longitudinal axis of the driven linkage.

When the anchor is submerged, it is preferably spaced forwardly of the buoyant body such that the buoyant body trails the anchor in the wave direction.

In one embodiment the anchor is secured directly to the seabed. Alternatively, the anchor may comprise a reaction plate oriented substantially perpendicularly to the longitudinal axis of the driven linkage for being supported in deep water, with the reaction plate being slack-moored to the seabed.

Preferably connection of the driven linkage with one or both of the buoyant body and the anchor is selectively releasable for releasing the buoyant body from a working position to a transport position.

In one embodiment, one of the buoyant body and the anchor includes a first connector and the driven linkage includes a second connector for mating connection with the first connector when coupled in the transport position. To reconnect the connectors in the working position there may be provided a tow cable coupled at a first end to one of the connectors with the tow cable extending about a pulley supported on the other one of the connectors such that pulling on a second end of the tow cable draws the first end of the tow cable towards the pulley and thus draws the first and second connectors together.

It is independently advantageous to provide a variable ballast on the buoyant body which is operable to increase buoyancy of the buoyant body in the transport position in relation to the working position.

The buoyant body may be rotated in a direction to displace the working surface upwardly as the buoyant body is displaced from the working position to the transport position.

Preferably the variable ballast increases buoyancy responsive to displacement of the buoyant body into the transport position.

Displacement of the buoyant body into the transport position may occur by action of buoyant members when the buoyant body is released from the anchor, by providing a rear surface opposite the working surface which is sloped upwardly in the wave direction for rotating the buoyant body into the transport position when the buoyant body is displaced in the wave direction along a water surface, or by a combination of the two.

An optional tow cable attachment on the rear side of the buoyant body permits connection to a tow cable for towing the buoyant body in the wave direction.

The variable ballast preferably comprises a ballast chamber which receives water therein as ballast in the working position and drainage ports which automatically drain the water from the ballast chamber when the buoyant body is displaced from the working position to the transport position.

A rear side of the buoyant body opposite the working surface may be suitably shaped for reduced drag when towed across a surface of a body of water and may further include pontoons attached thereto having a longitudinal axis extending generally in the wave direction to assist in supporting the buoyant body in the transport position.

The rear side of the buoyant body may also include rolling members for supporting the buoyant body for rolling movement along the ground during transport, storage or maintenance.

When the buoyant body includes a ballast chamber for receiving water as ballast therein, a working volume of the ballast chamber is preferably adjustable for adjusting buoyancy of the buoyant body. When the ballast chamber includes drainage ports through which water in the ballast chamber is drained, the working volume of the ballast chamber may be adjustable by adjusting elevation of the drainage ports in relation to the ballast chamber.

Baffles may be supported in the ballast chamber for limiting the movement of the water in the ballast chamber to increase stability of the buoyant body.

There may be provided an extension surface oriented parallel to the lower portion of the working surface at the outer end thereof to project downwardly and forwardly from the working surface, the extension surface being supported on the anchor in fixed relationship therewith for sliding movement relative to the working surface.

There may be provided at least one support arm spanning between the outer end of the upper portion and the outer end of the lower portion of the working surface.

The buoyant body includes a front wall which is sloped downwardly and rearwardly in the wave direction and a rear wall which is sloped upwardly and rearwardly in the wave direction and wherein there is provided a panel member below the buoyant body which projects upwardly and rearwardly in the wave direction substantially in alignment with the rear wall of the buoyant body, the upper portion of the working surface being defined by the front wall of the housing and the lower portion of the working surface being defined by the panel member.

The usable form of energy may comprise either an electrical current or a flow of pressurized water depending upon the nature and configuration of the driven linkage.

When the driven linkage comprises a pump and the usable form of energy comprises a flow of pressurized water, there may be provided a bladder accumulator coupled in series with an outlet of the pump for producing a more uniform pressured flow from the outlet of the pump.

The pump may be dual acting for producing a flow of pressurized water on both upward and downward movements of the buoyant body relative to the anchor.

There may be provided desalination equipment supported within the buoyant body for communication with an outlet of the pump to produce a pressurized flow of desalinated water exiting the buoyant body.

Alternatively, there may be provided a turbine generator supported within the buoyant body for communication with an outlet of the pump to produce an electrical current.

In a further embodiment, the driven linkage comprises a linear driven electrical generator for directly producing an electrical current.

There may be provided solar panels supported on a top side of the buoyant body, also for producing an electrical current. When there is provided an electronic control mechanism supported on the buoyant body for controlling various operating conditions of the device, the electronic control mechanism preferably receives power from the solar panels.

In one embodiment, the buoyant body is comprised of a plurality of elongate closed pipes comprised of plastic or composite material in which the pipes have been coupled together.

According to a further independent aspect of the present invention there is provided a wave energy device for capturing heave forces of waves propagating in a wave direction, the device comprising:

a buoyant body for tracking a rise and fall of the waves responsive to the heave forces of the waves;

an anchor for being substantially anchored against the rise and fall of the waves;

a driven linkage coupling the buoyant body to the anchor for relative movement therebetween and for converting said relative movement into a usable form of energy;

connection of the driven linkage with at least one of the buoyant body and the anchor being selectively releasable for releasing the buoyant body from a working position into a transport position; and a variable ballast on the buoyant body operable to increase buoyancy of the buoyant body in the transport position in relation to the working position.

Various embodiments of the invention will now be described in conjunction with the accompanying drawings in which:

BRIEF DESCRIPTION OF THE DRAWINGS

FIG. 5 is a front elevational view of the wave energy device.

FIG. 6A is a rear elevational view of the wave energy device in the working position.

FIG. 6B is a schematic representation of the drainage ports shown in FIG. 6A at various operating levels.

FIG. 9 is a perspective of a first embodiment of the anchor.

FIG. 10 is an elevational view of a second embodiment of the anchor.

FIG. 11 is a side elevational view of the wave energy device in a transport position.

FIG. 18A is a perspective view of a further embodiment of the wave energy device for producing electrical power.

FIG. 18B is a perspective view of a portion of the buoyant body illustrating an alternative construction configuration of the buoyant body.

In the drawings like characters of reference indicate corresponding parts in the different figures.

DETAILED DESCRIPTION

Figure 1:
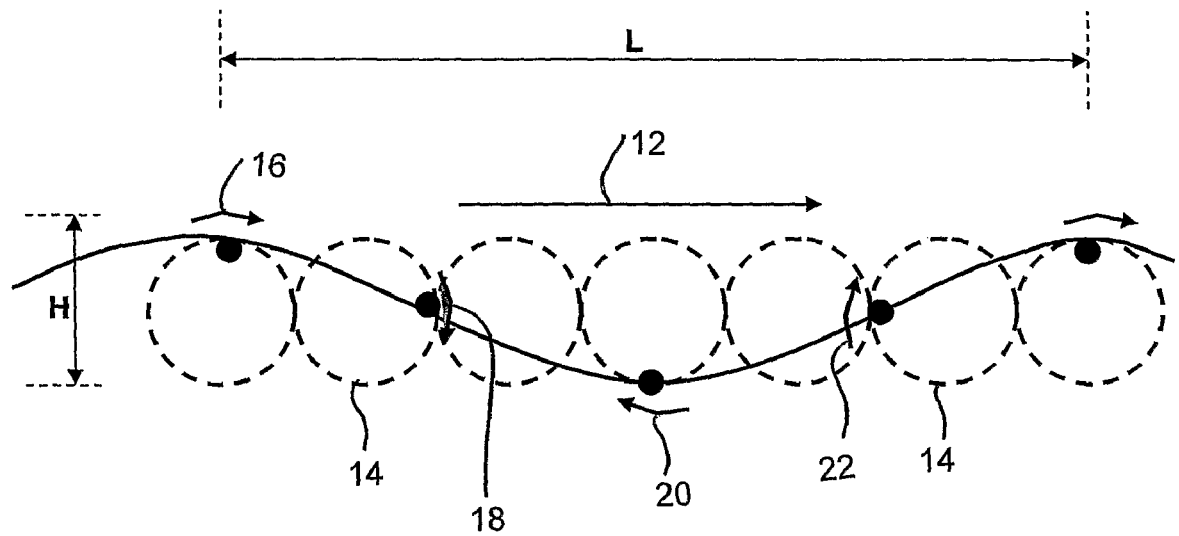
FIG. 1 is a schematic view of a typical wave motion.

Referring to the accompanying figures there is illustrated a wave energy device generally indicated by reference numeral 10. The device 10 is particularly suited for capturing wave energy from waves propagating in a wave direction 12. The device 10 is arranged to convert the wave energy into a usable form of energy, for example electrical power or a flow of pressurized water which can be later used either at the wave energy device or at a remote location for desalinating seawater or for driving an electrical turbine generator.

Figure 2:
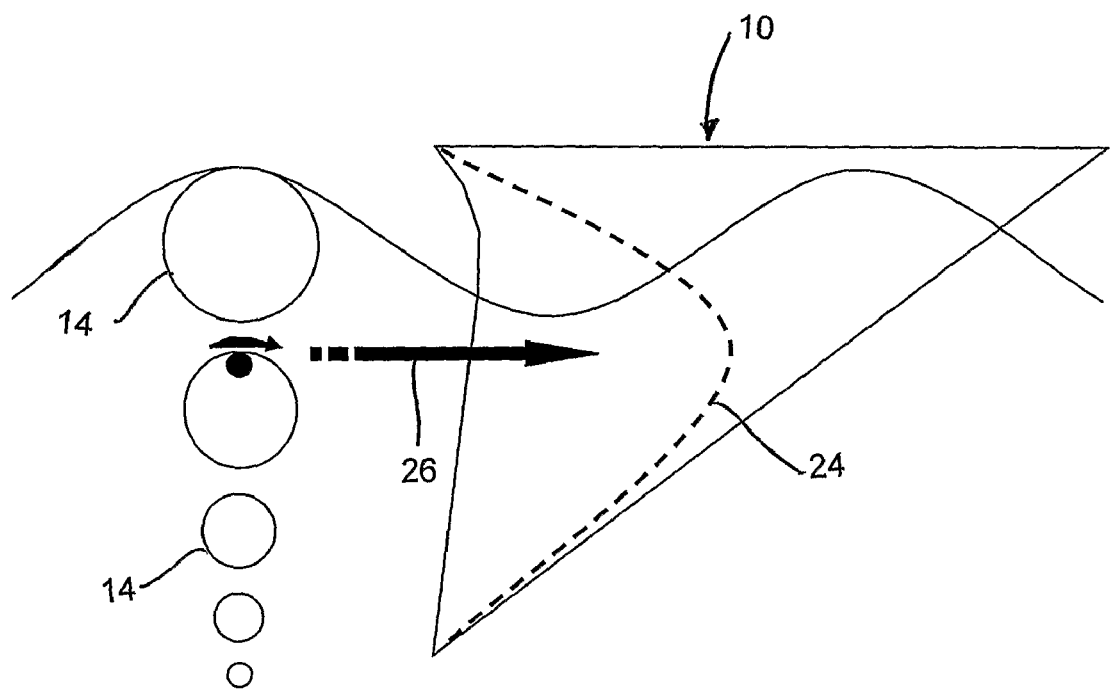
FIG. 2 is a schematic side elevational view of the wave energy device in relation to surrounding wave motion.
Figure 3:
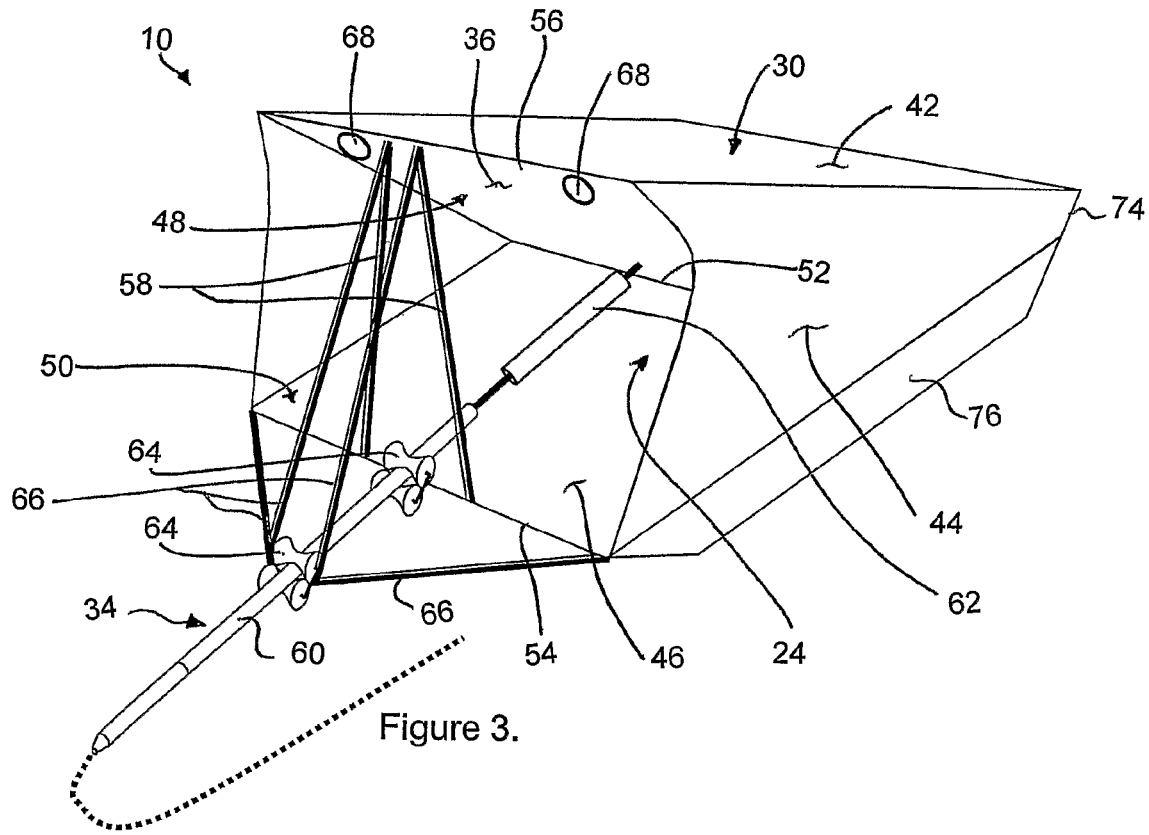
FIG. 3 is a perspective of the wave energy device.

With initial reference to FIGS. 1 and 2, waves propagating in the wave direction 12 typically are comprised of water following generally orbital motions 14 advancing generally in a shoreward direction of wave propagation. As the water goes through orbital motions 14 the water forms a wave having a wavelength L between the crests of adjacent waves and a height H between each crest and the adjacent trough.

At the crest of each wave, at an upper portion of the orbital motions 14, the wave energy is primary in the form of shoreward surge forces 16 oriented generally horizontally in the wave direction towards shore. On the falling side of the wave, and at a shoreward side of the orbital motions 14, the wave energy is primarily in the form of heave forces oriented downwardly towards the trough between adjacent waves. At the trough, the wave energy is primarily in the form of a returning surge force 20 opposing the wave direction in a horizontal and seaward orientation away from shore. Finally, at the rising side of the wave, wave energy in the orbital motions 14 takes the form of further heave forces 22 in an upward direction towards the crest of the wave.

In addition to orbital motions 14 at the surface, the water in a wave structure also follows orbital motions to a substantial depth below the surface in which the wave energy of the orbital motions decreases with increasing distance from the surface of the water. Typically approximately 95% of the wave energy in a wave is present above a prescribed depth corresponding approximately to a quarter of the wavelength of the wave motion.

Turning now to the wave energy device 10, the device itself includes a working surface 24 which faces forwardly, opposite the wave direction, to confront the oncoming waves propagating in the wave direction. The working surface 24 spans vertically in a working position to a sufficient depth to be arranged to capture a substantial portion of the wave energy both at the surface and substantially below the surface in a given area. The cumulative forces 26 of the orbital motions 14 are captured by the working surface 24 to cause the device 10 to track the rise and fall of the waves and in turn convert this motion into the usable forms of energy noted above.

The device 10 generally comprises a buoyant body 30 which has a suitable buoyancy for supporting the device only partially submerged at the surface of the waves for tracking the rise and fall of the waves. The buoyant body 30 is coupled to an anchor 32 by a suitable driven linkage 34 which controls relative movement between the buoyant body 30 and the anchor 32. The anchor 32 is substantially anchored against the rise and fall of the waves and against the surge and heave forces of the waves to produce the relative movement between the buoyant body 30 and anchor 32. The driven linkage 34 acts to convert this relative movement between the buoyant body and the anchor 32 into the usable forms of energy.

The buoyant body 30 includes a front wall 36 which is sloped downwardly and rearwardly in the wave direction from the front side of the device. The front wall 36 meets with a rear wall 38 which projects upwardly and rearwardly from the bottom end of the front wall in the wave direction to define a triangular shaped volume therebetween when viewed in side elevation.

The volume of the hollow interior defined within the walls of the buoyant body 30 comprises a ballast chamber 40. A top wall 42 spans horizontally between the top of the front wall 36 and the top of the rear wall 38 for enclosing the top side of the ballast chamber 40. Side walls 44 are also provided at opposing sides of the device for enclosing the ends of the ballast chamber 40. Each side wall 44 thus spans generally in the wave direction between the front wall, rear wall, and top wall.

Figure 4:
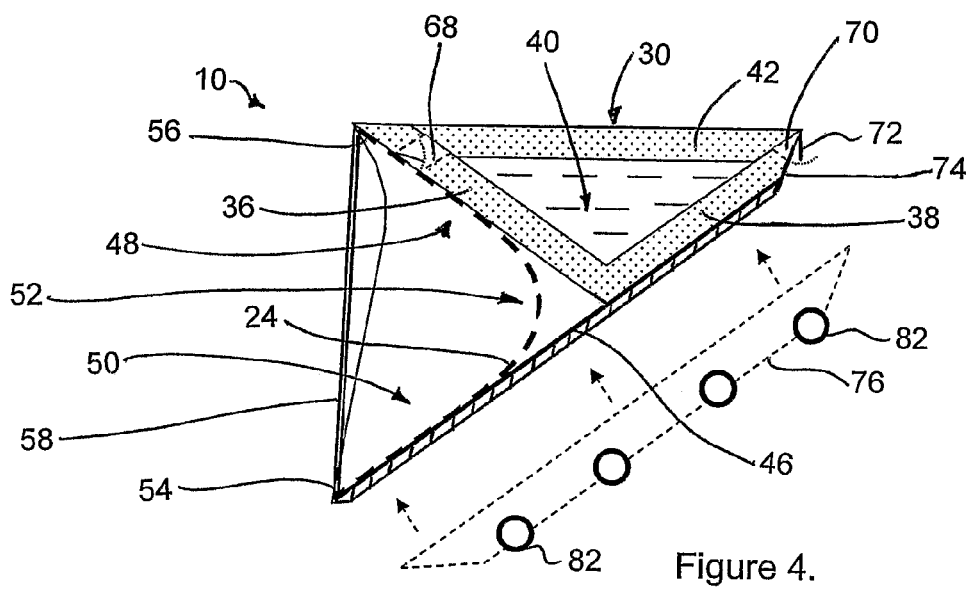
FIG. 4 is a partly sectional side elevational view of the wave energy device.
Figure 7:
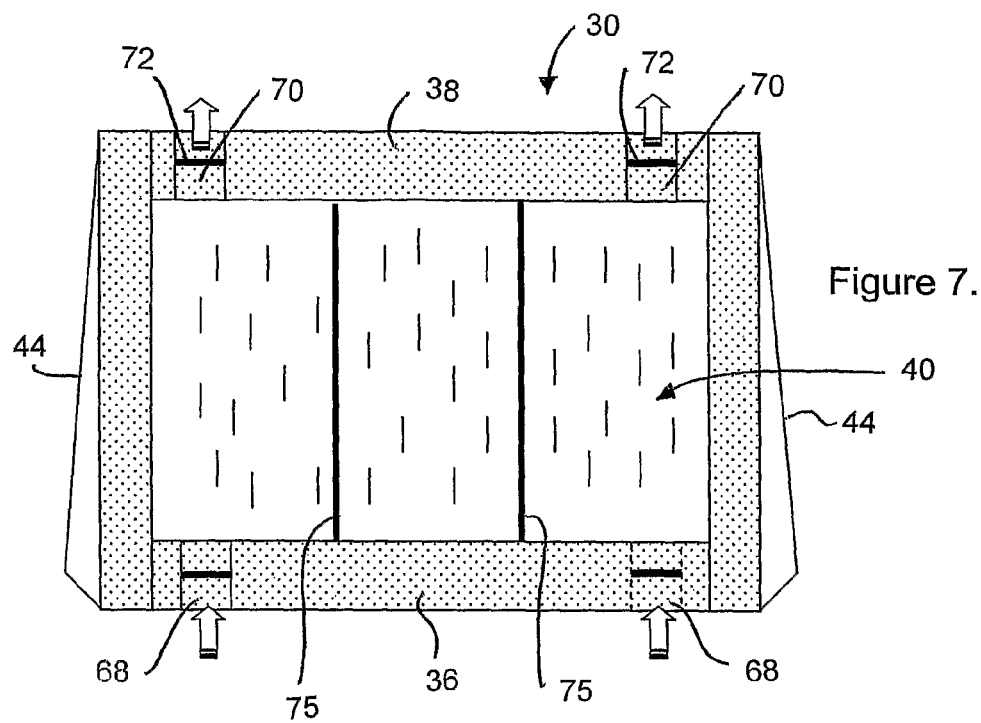
FIG. 7 is a top plan view of the wave energy device in which a top side of the buoyant body has been removed to illustrate an interior of the buoyant body.
Figure 8:
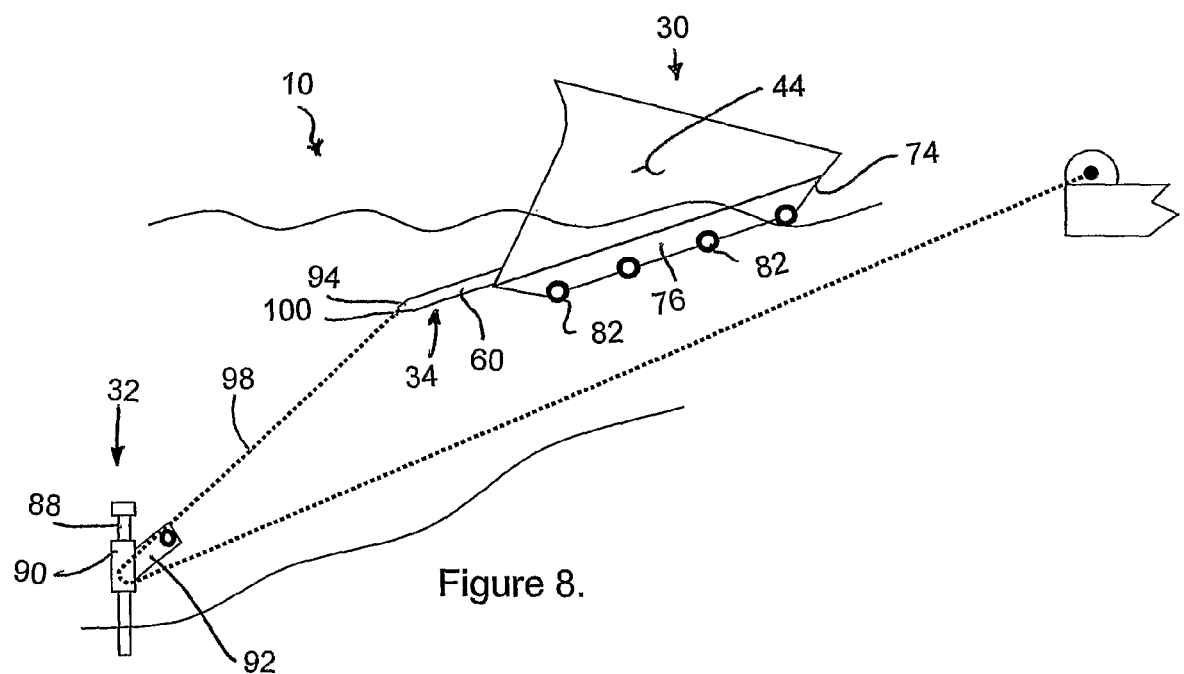
FIG. 8 is a side elevational view of the wave energy device as the device is being towed into the working position.

The interior of the ballast chamber 40 of the buoyant body 30 includes suitable flotation material which is distributed evenly between the front and rear walls, and optionally on the top wall 42 to support the device level in the working position as shown in FIGS. 2 and 4 for example.

A panel member 46 is coupled with the buoyant body 30 to project downwardly and forwardly from an apex at the intersection of the front and rear walls. The panel member 46 is coplanar with the rear wall 38 so that the rear side of the device comprises a flat rear surface defined by the rear wall 38 and the panel member 46 which are continuous with one another.

The buoyant body 30 and the panel member 46 together define the working surface 24 in which the front wall 36 of the buoyant body 30 defines an upper portion 48 of the working surface while the panel member 46 projecting below the buoyant body 30 defines a lower portion 50 of the working surface 24. The upper and lower portions of the working surface meet at an intersection 52 forming an inner end of each of the upper and lower potions.

The lower portion of the working surface 24 extends from the inner end to an outer end 54 which is spaced downwardly and forwardly in relation to the respective inner end at the intersection 52. Alternatively the upper portion of the working surface extends from the inner end at the intersection 52 to a respective outer end 56 which is spaced forwardly and, upwardly in relation to the inner ends at the intersection 52.

The upper and lower portions of the working surface 24 are generally planar in which the lower portion 50 has a surface area which is near or greater than a surface area of the upper portion 48. When the upper and lower portions are oriented near perpendicular to one another as in the illustrated embodiment, the outer end of the upper portion is above the outer end of the lower portion, substantially in vertical alignment therewith in the working position.

By forming the upper and lower portions of the working surface 24 as inclined planar surfaces which are substantially continuous with one another across the intersection 52, a scoop-like receptacle is formed for trapping water therein along with the associated wave energy of waves propagating in the wave direction. The working surface has a height in the working position between the outer end of the upper portion and the outer end of the lower portion which is suitable for capturing a majority of the energy from the waves.

The trapping effect is enhanced by extending the side walls 44 of the buoyant body to span between the outer end 54 of the lower portion and the outer end 56 of the upper portion of the working surface 24. The side walls 44 thus span between the upper and lower portions of the working surface at spaced apart locations which are spaced apart in a horizontal direction which is substantially perpendicular to the wave direction.

The side walls 44 have a concave interior surface facing into the capture volume defined by the working surface while being oriented to diverge from one another from the inner ends to the outer ends of the working surface. The horizontal spacing between the opposed side walls 44 thus tapers and becomes narrower as the waves propagate in the wave direction into the capture volume defined by the working surface 24 and the interior concave surfaces of the side walls 44.

The size of the buoyant body 30 and panel member 46 projecting therebelow are arranged such that a horizontal width of the device as measured in a direction perpendicular to the wave direction is plural times a length of the device between the front side and the rear side as measured in the wave direction at a still water surface. Wave action alone is thus sufficient to orient the device to face forwardly into the wave direction.

Figure 14:
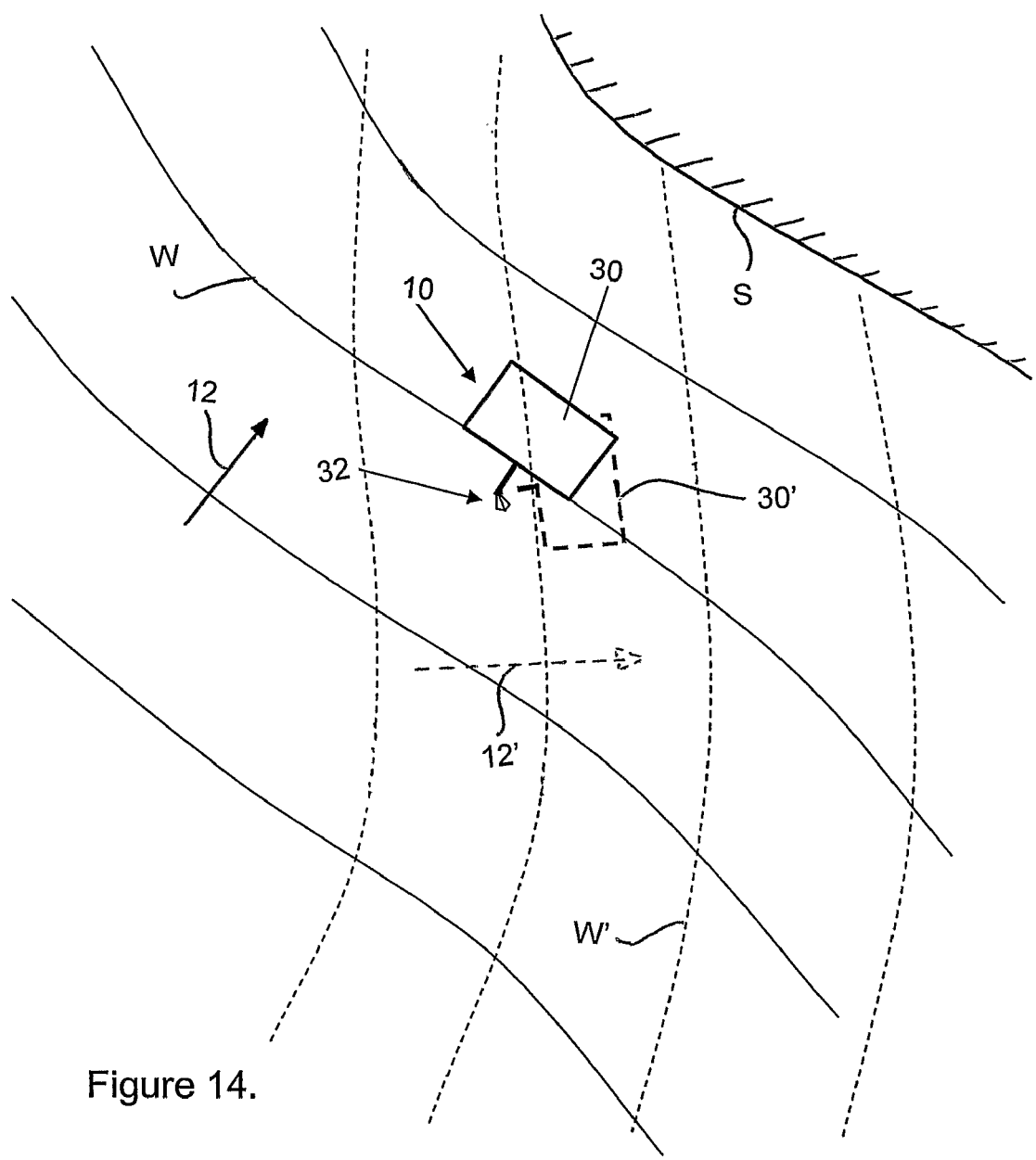
FIG. 14 is a top plan view of the wave energy device shown in relation to waves approaching the shore at different wave directions.

As shown from above in FIG. 14, waves 12 are shown propagating in a first direction towards shore in solid line. The device 10, also shown in solid line, orients itself to be facing forwardly to confront the wave direction as the elongate lateral dimension of the buoyant body aligns with the longitudinal direction of the wave crests, perpendicular to the wave direction. Alternatively, when the waves approach from a different direction as shown in broken line in the same figure, the device automatically reorients itself by rotating about the vertical axis of the anchor. Accordingly the device 10 as shown in broken line is similarly oriented to face forwardly to confront the wave direction with a longitudinal axis of the housing being parallel to the longitudinal direction of the wave crests shown in broken line.

The buoyant body 30 is permitted to rotate about the vertical axis of the anchor 32 with changes in wave direction by fabricating the buoyant body such that the buoyant body width is greater than the buoyant body length. These dimensions apply to measurements taken at the still water surface in the working position. In so doing, the long axis of the buoyant body 30 aligns itself parallel to the wave front just as a long wooden stick floating on the water surface will align its long axis with the wave front. This capability to rotate allows the device to always align itself at an optimum angle to the oncoming waves thereby increasing the overall efficiency of the device. The wave front W, in FIG. 14, is substantially parallel to the shoreline S with the long axis of the buoyant body 30 shown to be parallel to the wave front W which is illustrated as a solid line. The long axis of the buoyant body 30' is also shown in broken line to be parallel to a wave front W' having a different wave direction 12', which is illustrated as a broken line. This illustrates how the buoyant body rotates about the vertical axis of the anchor 32 as the wave direction changes.

The panel member 46 is supported at its outer end 54 in relation to the outer end 56 of the upper portion of the working surface by suitable support arms 58 which span the open mouth area of the wave capturing and trapping volume defined by the working surface. The support arms 58 comprise rigid high strength members of narrow cross sectional dimension so that the support arms have substantially no effect on the waves flowing past the support arms into the volume defined by the working surface 24.

The driven linkage 34 generally comprises a linearly driven linkage which couples the buoyant body 30 to the anchor 32 for relative linear sliding movement along an axis which is inclined upwardly and rearwardly in the wave direction from the anchor 32 to the buoyant body 30. The axis of relative movement between the buoyant body and the anchor is substantially parallel to the panel member 46 defining the lower portion 50 of the working surface 24 as well as the rear wall 38 lying substantially coplanar with the lower portion of the working surface.

Figure 12:
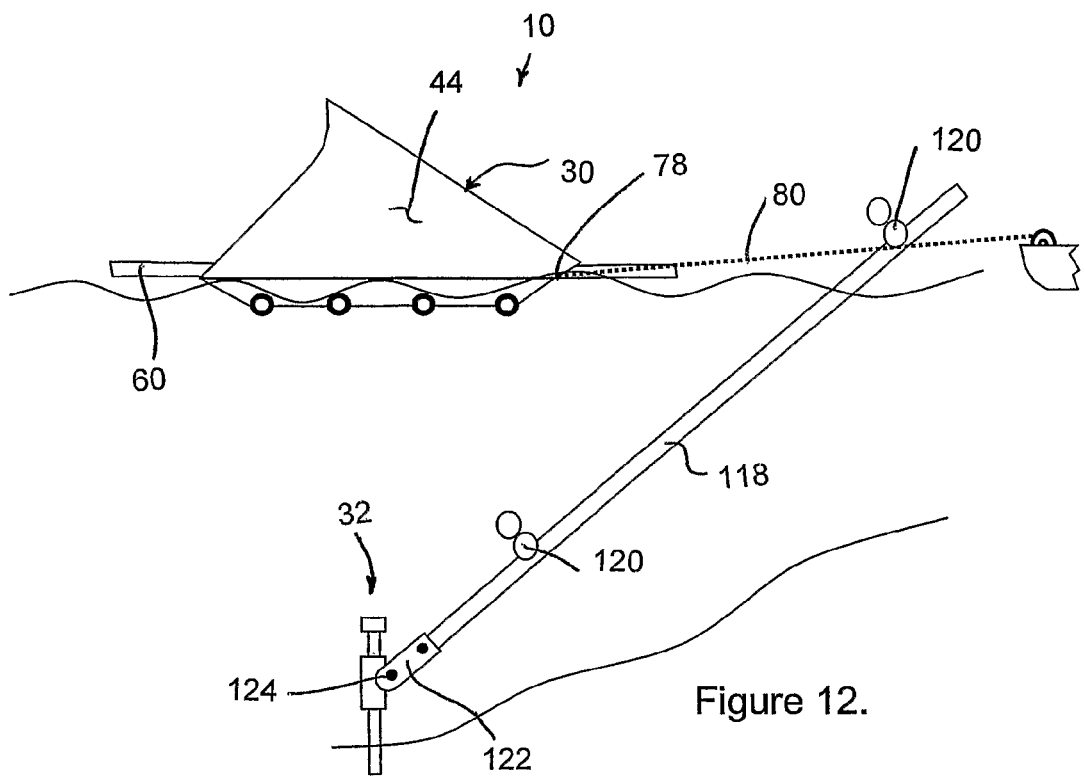
FIG. 12 is a side elevational view of a further embodiment of the driven linkage in which the driven linkage is shown separated from the anchor in the transport position.

The driven linkage 34 generally comprises a piston rod 60 which is coupled to the buoyant body 30 for relative movement therebetween along the longitudinal axis of the relative linear sliding movement of the driven linkage. The piston rod 60 is arranged to be coupled to the anchor 32 in a manner to restrict relative movement between the piston rod 60 and the anchor 32 along the axis of relative linear sliding movement. Connection between the piston rod 60 and the anchor 32 is arranged to be releasable for releasing the buoyant body 30 from the working position to the transport position as shown in FIGS. 11 and 12.

The driven linkage 34 further includes a housing 62 which slidably receives the piston rod therein. The housing 62 is coupled to the buoyant body and the panel member 46 defining the working surface for movement together relative to the anchor and the piston rod 60 coupled to the anchor.

The housing 62 of the driven linkage 34 includes suitable bushings between the housing and the piston rod 60 for guiding the relative movement therebetween along the axis of linear sliding movement. Additional roller supports 64 are coupled for movement with the buoyant body 30 by auxiliary support arms 66. The support arms 66 are all formed of rigid high strength material having a narrow dimension in cross section so as not to affect the wave motion of water flowing therethrough into the volume defined by the working surface 24. Plural sets of roller supports 64 are supported at longitudinally spaced positions along a longitudinal axis of linear sliding movement of the driven linkage 34 for additional support. The piston rod 60 connected to the anchor 32 thus carries the buoyant body 30 and panel member 46 coupled thereto for sliding movement along the piston rod by the roller supports.

Though various embodiments of the anchor 32 are illustrated in the accompanying Figures, in each instance the anchor is arranged to support the driven linkage 34 coupled thereto for relative pivotal movement about an upright vertical axis so that the buoyant body is capable of weathervane action relative to the anchor. The buoyant body thus always trails the anchor in the wave direction with the driven linkage 34 having its longitudinal axis of linear sliding movement oriented generally in the wave direction as well. The anchor 32 also supports the driven linkage in a manner such that the buoyant body 30 can be rotated about the longitudinal axis of the driven linkage to permit side to side tilting motion of the buoyant body relative to the anchor. This rotation about the longitudinal axis is accomplished by the piston rod 60 being rotatable about its longitudinal axis relative to the housing 62 which slidably receives the piston rod.

The ballast chamber 40 is arranged to provide the buoyant body 30 with a variable ballast which is operable to increase buoyancy of the buoyant body in the transport position in relation to the working position. The variable ballast thus assists in raising the device out of the water for less drag when towing back to shore for maintenance or for sheltering from various climate conditions. The buoyant body 30 is arranged to be rotated from the working position to the transport position in a manner such that the working surface at the front side of the device is displaced upwardly from the working position to the transport position.

The variable ballast in the ballast chamber is arranged to automatically increase buoyancy of the buoyant body responsive to rotation of the buoyant body into the transport position. Rotation of the buoyant body into the transport position may be assisted by buoyancy at the outer end of the lower portion of the working surface when the anchor is released. Alternatively or additionally, the rotation into the transport position may be accomplished by forming the rear surface of the buoyant body and panel member opposite the working surface to be sloped upwardly and rearwardly in the wave direction when in the working position. By sloping the rear surface of the buoyant body, simply advancing the buoyant body in the wave direction along the water surface urges the front end of the buoyant body upwardly by ramping and planing action over the water surface.

Ballast in the ballast chamber 40 is variable by providing inlet ports 68 at the upper portion of the front wall and outlet ports 70 in the upper portion of the rear wall 38. The inlet ports 68 remain open and include one way valves formed therein to permit only the entry of water into the ballast chamber. A suitable screen or guard is provided at the inlet of the ports 68 to prevent access of debris and the like into the interior of the ballast chamber. Two inlet ports 68 are provided, spaced apart from one another along the outer end at the top of the working surface 24 so that oncoming waves at the front of the housing enter into the inlet ports to maintain water within the ballast chamber to act as ballast.

The outlet ports 70 comprise drainage ports which permit excess water in the ballast chamber to be drained out at the rear side of the buoyant body 30. The outlet ports 70 are similarly provided adjacent the top wall 42 at spaced apart positions in a horizontal direction with screens or grills being provided at the outlet side to prevent access of debris and the like into the interior of the ballast chamber. The outlet ports 70 include one way valves which only permit flow of water out of the ballast therethrough.

The outlet ports also include suitable gate members 72 arranged to span the outlet ports from the bottom end up to a variable elevation in relation to the surrounding buoyant body 30 so that elevation of the remaining open portion of the outlet ports is effectively varied by varying the height of the gate members 72 between various positions as shown in FIG. 6B. A working volume of the ballast chamber 40 is thus defined by the elevation of the gate members 72 which in turn control the volume of water which can be retained in the ballast chamber 40 before draining out through the remaining open portion of the outlet ports 70.

By locating the outlet ports 70 in the rear wall of the buoyant body 30 and the rear wall 38 and panel member 46 substantially forming the rear side of the device 10, rotation of the buoyant body into the transport position locates the outlet ports below the ballast chamber. Any water in the ballast chamber will then drain out of the ballast chamber through the outlet ports by action of gravity automatically when in the transport position. Typically the outlet ports 70 always remain at least partially open so that draining of the ballast chamber to increase buoyancy occurs responsive to rotation of the buoyant body into the transport position from the working position.

The rear side of the buoyant body is suitably shaped for reduced drag when towed across a surface of a body of water by providing a tapered end 74 at the upper portion of the rear wall 38 which is inclined inwardly and upwardly in relation to the remaining portion of the rear wall 38 and the panel member 46. Accordingly, once the rear wall and panel member are substantially horizontal in the transport position, the tapered end 74 at the upper portion of the rear wall remains inclined upwardly and rearwardly in the wave direction to assist in ramping the buoyant body upwardly over the water surface when the buoyant body is towed in the wave direction.

To assist transport of the buoyant body in the transport position, pontoons 76 are provided on the rear side of the buoyant body which extend generally in the wave direction spaced apart and parallel from one another at opposing sides of the buoyant body so as to be located adjacent the opposing side walls 44 respectively. The pontoons have respective longitudinal axes that extend upwardly and rearwardly along the rear side of the housing in the working position so as to be oriented substantially horizontally with the rear side in the transport position.

A tow cable attachment 78 is provided at the upper end of the rear wall 38 of the buoyant body for connection to a suitable tow cable 80 which is used to pull the buoyant body back to shore for storage or maintenance. Wheels 82 are provided on the bottom sides of the pontoons 76 in which the wheels are oriented to support the buoyant body for rolling movement in the wave direction or in the forward and rearward direction of the buoyant body once the buoyant body is towed back to shore.

The ballast chamber 40 includes a plurality of baffles 75 which substantially span a full height of the interior volume of the ballast chamber at a plurality of horizontally spaced locations. The baffles 75 are generally oriented in the wave direction and are spaced apart in a direction perpendicular to the wave direction from one another. The baffles 75 act to limit movement of the water in a side to side direction within the ballast chamber to increase side to side stability of the buoyant body. The baffles do allow some flow of water thereacross to maintain an even elevation of water throughout the ballast chamber.

The pontoons 76 extending along the rear side of the buoyant body 30 each include a lower valve 84 and an upper valve 86 for controlling the flow of water into and out of the pontoons which provides further variable ballast to the buoyant body 30. When initially in the transport position, the lower valve 84 and the upper valve 86 of each pontoon are initially closed for trapping a volume of air within the pontoons to assist in maintaining the buoyant body afloat.

When it is desired to displace the buoyant body into the working position, both sets of valve 84 and 86 are opened. The lower valves 84 are located at the outer end 54 at the bottom of the lower portion and permit the entry of water into the pontoons while the opposing upper valves 86 exhaust air from the pontoons to fill the pontoons with water and decrease buoyancy of the buoyant body. As the buoyant body approaches the working position, waves impacting the working surface enter the inlet ports 68 of the ballast chamber 40 so that additional water ballast fills the ballast chamber.

Once fully in the working position, the valves 84 and 86 on the pontoons can be closed for containing a fixed volume of water within the pontoons during operation. Upon subsequent return to the transport position for retrieval of the buoyant body, the valves 84 and 86 of the pontoons are opened. Upon subsequent release from the anchor and towing of the buoyant body back to shore in the wave direction, the ramping action of the rear surface of the buoyant body, along with some buoyancy of the buoyant body, acts to rotate the buoyant body back to the transport position. At this point, movement of the buoyant body in the wave direction causes water to drain out of the valves 84 at the outer end 54 of the lower portion of the working surface while air under atmospheric pressure enters the valves 86 located on a top side of the pontoons at an opposing end from the lower valves 84. When substantially all of the water has been drained out and replaced with air, the valves 84 and 86 can again be closed to maintain the buoyant body 30 in the transport position.

Accordingly, for transport, the tow cable attachment 78 is used for rapid towing of the buoyant body back to shore to cause the working surface to rise as the rear surface of the buoyant body planes on the surface of the water due to the orientation of the inclined lower portion in the working position, just as a water-skier is pulled up onto the water surface. As noted above, during the towing procedure the contained water within the pontoons is purged through the respective valves by atmospheric pressure allowing air to re-enter through the valves near the upper end of the pontoons. Once all of the water has been purged, the valves close and the buoyant body will float on the water surface.

Turning now to FIG. 9, a first embodiment of the anchor 32 will now be described in further detail. The anchor 32 in this instance comprises a vertical pin 88 which has been anchored to the seabed by insertion into the ground or by retention with a suitable weight. A sleeve 90 is rotatably supported on the pin 88 for rotation about the vertical axis of the pin. The pin 88 is longer than the sleeve so that the sleeve 90 is also slidable in a vertical direction along an upright vertical axis of the pin. A suitable head is provided at the top end of the pin 88 to restrict sliding movement of the sleeve 90 beyond the top end of the pin.

A socket 92 is anchored to the sleeve 90 for rotation therewith relative to the pin. The socket 92 is arranged to receive a bottom tapered end 94 of the piston rod 60 therein in the working position. A pulley 96 is mounted on the socket 92 for receiving a suitable tow cable 98 extending thereabout. The cable is attached at a first end 100 to the tapered end 94 of the piston rod with the pulley 96 being positioned within the socket 92 for alignment with the cable connection to the piston rod. The peripheral edge of the pulley 96 is centered within the socket 92 so that the cable lies concentrically within the socket. Pulling on the second end of the cable 98 pulls the cable about the pulley and draws the first end with the piston rod connected thereto into the socket 92. The driven linkage 34 is thus reconnected to the anchor in the working position. The driven linkage 34 can be maintained in coupled communication with the anchor 32 by maintaining tension on the cable 98 or by providing an additional latching mechanism as desired.

Turning now to FIG. 10 a further embodiment of the anchor is illustrated in which a sleeve 102 is anchored to the seabed floor and rotatably supports a pin 104 therein for rotation relative to the sleeve about an upright axis of the sleeve and pin. The pin in this instance supports the socket 106 to be oriented to extend upwardly and rearwardly in the wave direction at the ideal operating inclination of the longitudinal axis of the driven linkage. A pulley 108 is provided on the pin 104 for alignment of a cable 110 wrapped thereabout with the longitudinal axis of the socket and a tapered end 112 of the piston rod 60 received therein. The cable 110 is similarly anchored at a first end to the tapered end 112 of the piston rod for extending about the pulley 108.

The cable 110 also extends about an additional base pulley 114 supported on the fixed sleeve 102. The base pulley 114 rotates about a horizontal axis which remains fixed in a generally horizontal orientation parallel to the shore and generally perpendicular to the wave direction. As the wave direction varies, the pulley 108 carried on the pin 104 pivots about the axis of the sleeve while the base pulley 114 remains oriented towards shore so that the second end of the cable remains at a fixed location on shore when towing the buoyant body 30 back towards the anchor for reconnection in the working position.

A latch arm 116 is pivotally coupled to the pin 104 for selective mating connection with a recess in the tapered end of the piston rod. The latch arm 116 is biased into the latched position for automatically latching upon insertion of the end of the piston rod into the socket. A suitable remote release is provided for releasing the latch arm 116 from shore or another remote location as desired.

In both of the embodiments of FIGS. 9 and 10, the sockets are fixed in inclination relative to the vertical axis upon which it is pivotally supported while both relative rotation about the vertical axis and relative sliding movement along the vertical axis are permitted between the sleeve and pin. The buoyant body can then be oriented in the wave direction and the elevation of the buoyant body relative to the seabed can be varied while the optimum operating inclination of the longitudinal axis of relative sliding movement of the driven linkage remains fixed.

Figure 13:
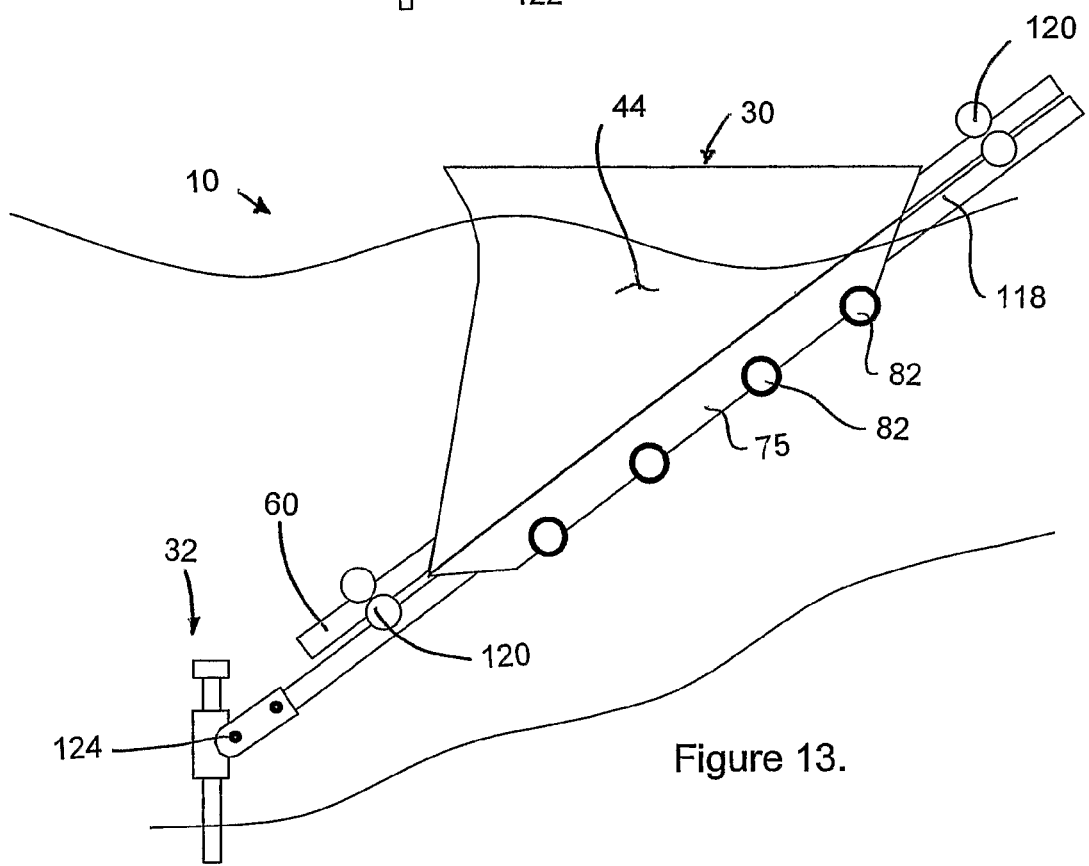
FIG. 13 is a side elevational view of the wave energy device according to FIG. 12 in the working position.

Turning now to FIGS. 12 and 13, a further embodiment of the driven linkage 34 is illustrated in which the piston rod 60 extends fully through the top side of the housing and is much longer than the rear surface of the buoyant body 30 including the rear wall 38 and the panel member 46. In this instance, suitable bushings and roller supports maintain rolling and sliding support of the buoyant body relative to the piston rod. The housing 62 of the driven linkage remains coupled to the buoyant body 30 for movement therewith relative to the piston rod 60 and anchor 32. Rather than coupling the piston rod directly to the anchor, a carrier arm 118 is coupled to the anchor which extends upwardly and rearwardly therefrom in the wave direction. Suitable couplings 120 are provided at both top and bottom ends of the piston rod 60 for coupling the piston rod 60 to the carrier arm 118 both above and below the buoyant body 30. In this instance the carrier arm and piston rod 60 coupled thereto fully carry and support the housing thereon for relative sliding movement.

In the embodiment of FIGS. 12 and 13, the socket 122 of the anchor 32 may also be coupled so that the socket 122, the carrier arm 118 and the piston rod 60 are all coupled together for pivotal movement about a horizontal axis at a pivot connection 124 on the anchor. Elevation of the buoyant body 30 relative to the seabed can thus be varied to accommodate tidal variations as may be desired.

Figure 15:
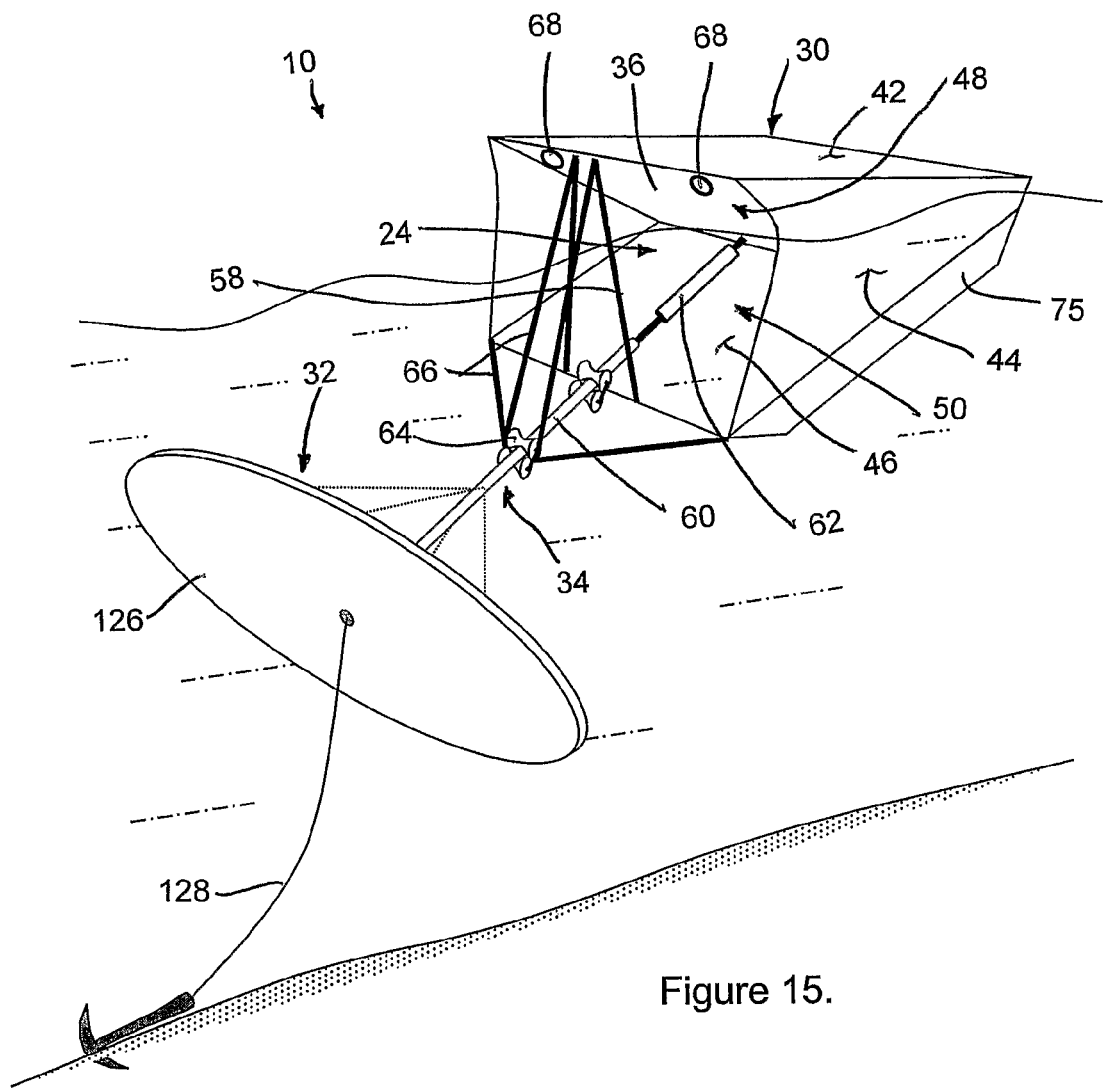
FIG. 15 is a perspective view of a further embodiment of the anchor comprising a reaction plate.

Turning now to FIG. 15, a further variation of the anchor 32 is illustrated in which the bottom end of the piston rod 60 is coupled to a reaction plate 126. The reaction plate 126 comprises a broad flat plate which is oriented perpendicularly to the longitudinal axis of relative sliding movement of the driven linkage 34 so as to be anchored against surge and heave forces of the waves when positioned in open water substantially below the surface of the water at a depth in which minimal or substantially no surge and heave forces are present. The reaction plate 126 has a working area which is near or greater than a combined surface area of the upper and lower portions of the working surface 24. The reaction plate 126 is connected by a tether to an anchor on the seabed floor in a catenary mooring configuration.

With further reference to FIG. 15, in the working position, the reaction plate 126 will be situated approximately one quarter of an average wavelength from the upper end of the buoyant body in the direction of the oncoming waves. At this position the orbital direction of the water particles will be approximately vertical, thus the force exerted on the reaction plate will not be in synchronization with the direction of force exerted on the buoyant body. This will act to resist synchronous movement of the reaction plate and the buoyant body thereby minimizing energy loss.

Figure 16:
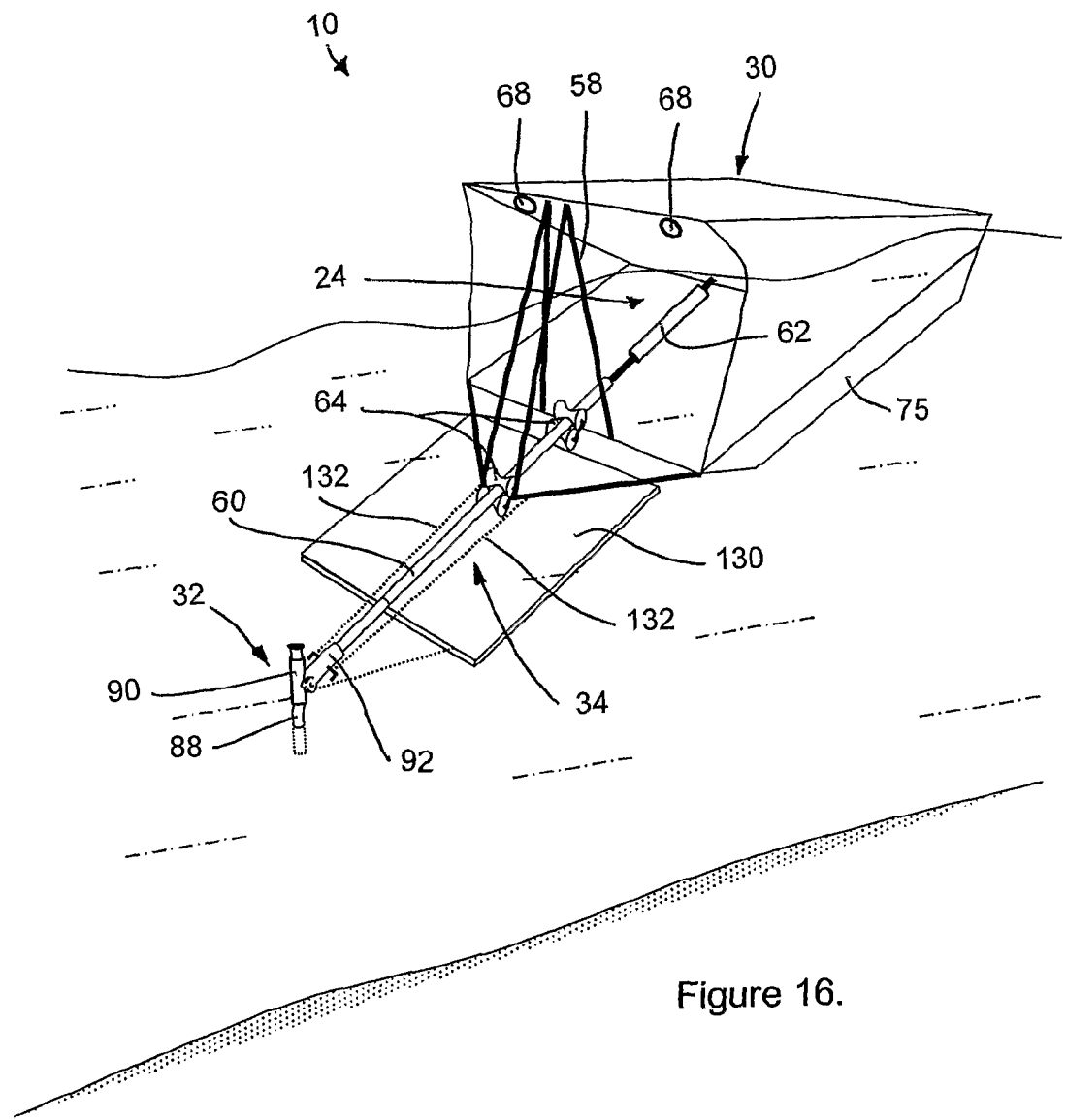
FIG. 16 is a perspective view of a further embodiment of the anchor comprising an extension surface.

Turning now to FIG. 16, a further embodiment of the driven linkage 34 is illustrated in which an extension surface 130 is provided to extend the lower portion 50 of the working surface 24. The extension surface 130 is anchored to the piston rod 60 which is in turn anchored to the anchor 32. Accordingly, the extension surface 130 remains fixed relative to the anchor while the working surface 24 of the buoyant body 30 is movable relative to extension surface along the longitudinal axis of relative sliding movement of the driven linkage. The extension surface 130 comprises a broad flat surface which is parallel to the lower portion 50 of the working surface at the outer end 54 thereof. The extension surface projects downwardly and forwardly from the working surface along the longitudinal axis of the driven linkage. The extension surface 130 thus assists forces of the wave below the working surface 24 to be directed upwardly into the working surface to increase the capture area of the working surface.

The driven linkage 34 in the embodiment of FIG. 16 is also shown with springs or biasing members 132 coupled between the anchor and the buoyant body 30 for biasing or urging the buoyant body back towards the anchor 32. In operation, surge forces and heave forces in the wave direction force extension of the driven linkage in which the housing 62 is displaced away from the anchor along the piston rod. As the buoyant body 30 is driven upward by the heave and surge forces, the return springs 132 are stretched thereby storing energy. This stored energy is subsequently used to cooperate with the gravitational forces for powering the device on the return downward stroke. The wave forces in the trough between adjacent crests, along with biasing force of the biasing member 132, act in a direction to urge the buoyant body back towards the anchor for retracting the piston rod 60 within its respective housing 62.

Figure 17:
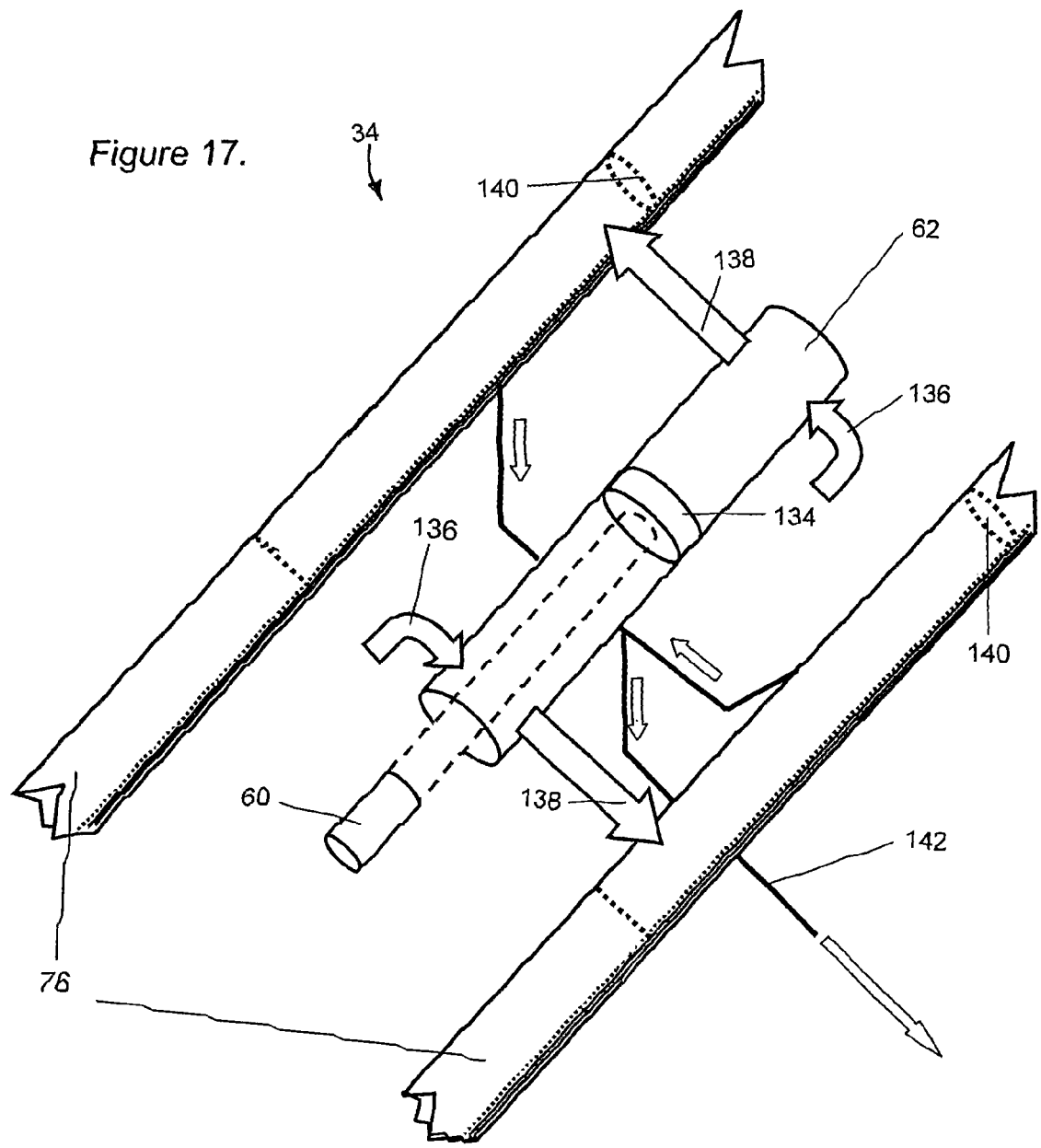
FIG. 17 is a schematic view of a dual acting pump for use with the wave energy device according to FIG. 1.

Turning now to FIG. 17, one embodiment of the driven linkage 34 is shown in which the driven linkage comprises a pump so that the usable form of energy produced is a flow of pressurized water. The pump comprises a dual acting pump in which the housing 62 is elongate and cylindrical about the longitudinal axis of the driven linkage. A piston 134 is mounted at the inner end of the piston rod 60 for sliding movement along the length of the cylindrical housing 62. The piston 134 divides the housing into two separate pumping chambers in which an inlet valve 136 and an outlet valve 138 communicate with each chamber at the respective opposite outer ends of the housing 62.

All of the valves 136 and 138 are one-way valves which permit flow either only into the housing or only out of the housing according to their respective inlet and outlet function. The piston 134, the piston rod 60 and the surrounding housing 62 are designed such that the rod has a sufficiently large diameter relative to the housing to withstand extreme side loading forces without bending. Side loading forces exerted on the piston and on the entry point of the rod through the housing 62 are dealt with by using high density bearings and bushings attached to the buoyant body 30 through which the piston rod 60 slides during reciprocating movement of the buoyant body 30 relative to the anchor.

Screened portions are provided which surround pre-filtering chambers in series with the inlet valves 136 to prevent the entrance of debris and the like into the pump. The outlet valves 138 are connected to respective accumulator chambers 140 within the pontoons 76 which are then coupled to a common outlet 142 of the pump from which a pressurized flow of water is delivered from the device. Pressurized water on both the upstroke and down stroke is thus delivered to the pressurized accumulator chambers 140 contained behind bulkheads within the upper ends of the pontoons 76. Air pressure and bladders in the accumulator chambers 140 produce a substantially steady state flow of pressurized raw sea water from the common outlet 142 to a remote desalination assembly situated on land or on a floating fresh water storage craft, or alternatively on the buoyant body.

When the driven linkage comprises a pump within the buoyant body, the pump outlet is coupled to a pressure intensifier as the pump alone supplies relatively low pressure, raw seawater. The pressure intensifier boosts the water pressure to a level required to accomplish the reverse osmosis process thereby removing most of the dissolved salt from the seawater.

In other embodiments of the invention, the pump may be single acting to only pressurize water on the upward stroke.

Turning now to FIG. 18A, a further embodiment of the driven linkage 34 is illustrated in which the driven linkage comprises a linear electric generator for generating electric power in response to the linear sliding movement of the piston rod 60 within the housing 62 of the driven linkage. As shown in FIG. 18A, the top wall 42 may also be sloped upwardly from opposing sides to a central apex 146 to provide inclined surfaces upon which solar panels 144 are mounted. The solar panels produce electrical power from solar energy to assist in the production of electrical power of the driven linkage 34. In this instance, any electronic control mechanisms, for instance for opening and closing appropriate valves or for optimizing the orientation of the solar panels, can be powered up from the electric power generated onboard the device either by the linearly driven electric generator forming the driven linkage 34 or by the solar panels 144.

Turning now to FIG. 18B, a further embodiment of the buoyant body 30 is illustrated in which the panels forming the walls of the buoyant body and the panel member 46 are formed of a plurality of elongate pipes which have been enclosed at opposing ends thereof and which have been linked adjacent one another to form a panel-like structure which has buoyancy due to a volume of air trapped within the interior of the closed pipes. The pipes 150 may comprise any suitable material having desirable weight characteristics while being sufficiently rigid to maintain the structural integrity of the buoyant body 30 of the device, for instance a high molecular weight polyethylene plastic material or various composite material. The pipes 150 may be joined by plastic welding or using suitable adhesives, fasteners or brackets and the like. The pipes 150 may also be used in conjunction with sheeted material 152 which is also comprised of a similar strong yet lightweight material. The pipes 150 are oriented generally in the wave direction and form the surfaces of the device which are subjected to working forces, including the working surface 24 and the front and rear walls of the buoyant body 30.

In yet further embodiments, the driven linkage 34 may comprise a pump for producing a pressurized flow of water in which an outlet of the pump is coupled directly to an electrical turbine generator which is housed within the buoyant body, between the front and rear walls, within the ballast chamber 40. The turbine thus replaces a portion of the working volume normally occupied by water ballast. The mass of the turbine contributes to the overall mass which drives the buoyant body 30 back downwardly towards the anchor 32.

In yet a further embodiment, the driven linkage 34 may comprise a pump for producing a pressurized flow of water which has an outlet coupled directly to desalination equipment also housed within the ballast chamber 40 in the buoyant body 30. Similarly to the turbine noted above, the desalination equipment thus replaces a portion of the working volume normally occupied by water ballast and the mass of the desalination equipment contributes to the overall mass which drives the buoyant body back downwardly towards the anchor. The desalination equipment in turn has an outlet from which a pressurized flow of desalinated water is then directed to a nearby fresh water holding structure either on a floating structure, a structure anchored to the seabed floor or a structure on shore.

Although in the accompanying Figures the illustrated angle between the upper and lower portions of the working surface is near perpendicular, a range of other angles still function effectively for capturing the heave and surge forces of waves received through the mouth between the outer ends of the upper and lower portions of the working surface at the front side of the buoyant body. As shown in broken line in FIG. 4, the intersection 52 between the upper portion and the lower portion of the working surface may comprise a concave intersection in which the upper portion, the lower portion and the intersection 52 comprise a continuous concave surface.

In further embodiments, there may be provided an additional guide system, which serves the purpose of stabilizing the vessel against rolling.

In all of the illustrated embodiments of the invention, the combined surge and heave forces inherent in a wave, along with buoyancy of the buoyant body 30, serve to drive the buoyant body 30 upward on an incline causing the driven linkage 34 to be displaced in an upward stroke. More specifically, as, the crest of a wave approaches, the surge force is contained between the side walls 44 and as it impacts the upper and lower portions of the working surface 24, this force is added to the buoyant force acting on the buoyant body 30 thereby driving the entire buoyant body upward along an incline parallel to the lower portion of the working surface at the outer end thereof. As the crest passes the gravitational force acting on the combined mass of the buoyant body, the water contained within the ballast chamber and any other mass movable with the buoyant body serves to drive the buoyant body downward on a decline causing the driven linkage to perform work and convert the energy into a usable form on the downward stroke.

In embodiments where an electrical turbine generator or desalination equipment is housed within the ballast chamber, the generator or the desalination equipment contributes to the combined mass upon which gravitational forces act for driving the buoyant body downward on the downward stroke.

In embodiments where biasing members 132 are coupled between the buoyant body 30 and the anchor 32, wave energy is stored in the biasing members 132 on the upstroke. This stored energy is released as a biasing force working in cooperation with the gravitational forces acting on the combined mass of the buoyant body, water ballast, and other masses movable with the buoyant body, for driving the buoyant body downward on the downward stroke.

Since various modifications can be made in or to this invention as herein above described, and many apparently widely different embodiments of same can be made within the spirit and scope of the claims without department from such spirit and scope, it is intended that all matter contained in the accompanying description shall be interpreted as illustrative only and not in a limiting sense.

The invention claimed is:

1. A wave energy device for capturing heave forces and surge forces of waves propagating in a wave direction in which the device faces forwardly to confront the waves propagating in the wave direction, the device comprising:
    a buoyant body for tracking a rise and fall of the waves;
    a working surface arranged for facing forwardly to confront the waves and being coupled to the buoyant body for movement together therewith, the working surface including an upper portion and a lower portion arranged for capturing a substantial portion of the surge forces in the wave direction and the heave forces of the waves between the upper and lower portions of the working surface;
    the lower portion of the working surface extending from an inner end to an outer end in which the outer end of the lower portion is spaced forwardly and downwardly in relation to the inner end of the lower portion;
    the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;
    an anchor arranged for being substantially anchored against the rise and fall and the surge forces of the waves; and
    a driven linkage coupling the buoyant body to the anchor for relative movement therebetween and for converting said relative movement into a usable form of energy;
    the driven linkage comprising a linear driven linkage which couples the buoyant body to the anchor such that the buoyant body is linearly slidable relative to the anchor along a linear axis which is inclined upwardly and rearwardly in the wave direction.

2. The device according to claim 1 wherein the upper portion and the lower portion of the working surface comprise a continuous surface in which the upper and lower portions are joined with one another at the respective inner ends.

3. The device according to claim 1 wherein the upper portion and the lower portion of the working surface are joined at the respective inner ends at a concave intersection.

4. The device according to claim 1 wherein the upper portion of the working surface comprises an inclined surface extending upwardly and forwardly from the inner end to the outer end thereof and the lower portion of the working surface comprises an inclined surface extending downwardly and forwardly from the inner end to the outer end thereof.

5. The device according to claim 1 wherein the upper portion of the working surface and the lower portion of the working surface are oriented near perpendicular relative to one another.

6. The device according to claim 1 wherein the outer end of the upper portion is substantially in vertical alignment above the outer end of the lower portion.

7. The device according to claim 1 wherein the lower portion of the working surface has a surface area which is near or greater in magnitude than a surface area of the upper portion.

8. The device according to claim 1 wherein there is provided a pair of upright side panels spanning between the upper portion and the lower portion horizontally spaced apart from one another at opposing ends of the working surface in which the side panels are spaced apart in a direction which is substantially perpendicular to the wave direction.

9. The device according to claim 8 wherein the side panels diverge from one another as the side panels extend forwardly from the inner ends to the outer ends of the portions of the working surface.

10. The device according to claim 1 wherein there is provided a biasing mechanism coupled between the buoyant body and the anchor for biasing the buoyant body towards the anchor.

11. The device according to claim 1 wherein the driven linkage comprises a piston rod coupled to the anchor and a housing which slidably receives the piston rod therein for converting relative movement between the piston rod and the housing into the usable form of energy, the housing being coupled to the buoyant body for movement together therewith.

12. The device according to claim 1 wherein a width of the buoyant body in a horizontal direction perpendicular to the wave direction is plural times a length of the buoyant body in the wave direction.

13. The device according to claim 1 wherein the driven linkage is coupled to the anchor for free pivotal movement about an upright axis.

14. The device according to claim 1 wherein the driven linkage is coupled to the anchor for relative sliding movement along an upright axis.

15. The device according to claim 1 wherein the driven linkage is coupled to the anchor for free pivotal movement about a horizontal axis.

16. The device according to claim 1 wherein the driven linkage has a longitudinal axis extending between the buoyant body and the anchor and wherein the buoyant body is coupled to the anchor for relative pivotal movement about the longitudinal axis of the driven linkage.

17. The device according to claim 1 wherein the anchor is submerged and is spaced forwardly of the buoyant body such that the buoyant body trails the anchor in the wave direction.

18. The device according to claim 1 wherein the driven linkage has a longitudinal axis extending between the buoyant body and the anchor and wherein the anchor comprises a reaction plate oriented substantially perpendicularly to the longitudinal axis of the driven linkage.

19. The device according to claim 1 wherein a rear side of the buoyant body opposite the working surface is suitably shaped for reduced drag when towed across a surface of a body of water.

20. The device according to claim 1 wherein a rear side of the buoyant body opposite the working surface includes pontoons attached thereto having a longitudinal axis extending generally in the wave direction.

21. The device according to claim 1 wherein a rear side of the buoyant body opposite the working surface includes a tow cable attachment thereon for connection of the rear side of the buoyant body to a tow cable.

22. The device according to claim 1 wherein a rear side of the buoyant body opposite the working surface includes rolling members for supporting the buoyant body for rolling movement along the ground.

23. The device according to claim 1 wherein the buoyant body includes a ballast chamber for receiving water as ballast therein in which a working volume of the ballast chamber is adjustable for adjusting buoyancy of the buoyant body.

24. The device according to claim 1 wherein the buoyant body includes a ballast chamber for receiving water as ballast therein and baffles supported in the ballast chamber for limiting the movement of the water in the ballast chamber.

25. The device according to claim 24 wherein the ballast chamber includes at least one drainage port therein through which water in the ballast chamber is drained out of the ballast chamber, the working volume of the ballast chamber being adjustable by adjusting elevation of said at least one drainage port in relation to the ballast chamber.

26. The device according to claim 1 wherein there is provided at least one support arm spanning between the outer end of the upper portion and the outer end of the lower portion of the working surface.

27. The device according to claim 1 wherein the usable form of energy comprises either an electrical current or a flow of pressurized water.

28. The device according to claim 1 wherein the driven linkage comprises a pump and the usable form of energy comprises a flow of pressurized water and wherein there is provided a bladder accumulator coupled in series with an outlet of the pump for producing a more uniform pressured flow from the outlet of the pump.

29. The device according to claim 1 wherein the driven linkage comprises a pump which is dual acting for producing a flow of pressurized water on both upward and downward movements of the buoyant body relative to the anchor.

30. The device according to claim 1 wherein the driven linkage comprises a pump and wherein there is provided desalination equipment supported within the buoyant body for communication with an outlet of the pump to produce a pressurized flow of desalinated water exiting the buoyant body.

31. The device according to claim 1 wherein the driven linkage comprises a pump and wherein there is provided a turbine generator supported within the buoyant body for communication with an outlet of the pump to produce an electrical current.

32. The device according to claim 1 wherein the driven linkage comprises a linear driven electrical generator for producing an electrical current.

33. The device according to claim 1 wherein there is provided at least one solar panel supported on a top side of the buoyant body for producing an electrical current.

34. The device according to claim 33 wherein there is provided an electronic control mechanism supported on the buoyant body for controlling various operating conditions of the device, the electronic control mechanism receiving power from said at least one solar panel.

35. The device according to claim 1 wherein the buoyant body is comprised of a plurality of elongate closed pipes comprised of plastic or composite material in which the pipes have been coupled together.

36. A wave energy device for capturing heave forces and surge forces of waves propagating in a wave direction in which the device faces forwardly to confront the waves propagating in the wave direction, the device comprising:
a buoyant body for tracking a rise and fall of the waves;
a working surface for facing forwardly to confront the waves and being coupled to the buoyant body for movement together therewith, the working surface including an upper portion and a lower portion for capturing a substantial portion of the surge forces in the wave direction and the heave forces of the waves between the upper and lower portions of the working surface;
the lower portion of the working surface extending from an inner end to an outer end in which the outer end of the lower portion is spaced forwardly and downwardly in relation to the inner end of the lower portion;
the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;
an anchor for being substantially anchored against the rise and fall and the surge forces of the waves; and
a driven linkage coupling the buoyant body to the anchor for relative movement therebetween and for converting said relative movement into a usable form of energy;
wherein the driven linkage comprises a piston rod coupled to the anchor and a housing which slidably receives the piston rod therein for converting relative movement between the piston rod and the housing into the usable form of energy, the housing being coupled to the buoyant body for movement together therewith; and
wherein the piston rod extends through opposing sides of the buoyant body and the piston rod carries the buoyant body for sliding movement therealong.

37. A wave energy device for capturing heave forces and surge forces of waves propagating in a wave direction in which the device faces forwardly to confront the waves propagating in the wave direction, the device comprising:
a buoyant body for tracking a rise and fall of the waves;
a working surface for facing forwardly to confront the waves and being coupled to the buoyant body for movement together therewith, the working surface including an upper portion and a lower portion for capturing a substantial portion of the surge forces in the wave direction and the heave forces of the waves between the upper and lower portions of the working surface;
the lower portion of the working surface extending from an inner end to an outer end in which the outer end of the lower portion is spaced forwardly and downwardly in relation to the inner end of the lower portion;
the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;
an anchor for being substantially anchored against the rise and fall and the surge forces of the waves; and
a driven linkage coupling the buoyant body to the anchor for relative movement therebetween and for converting said relative movement into a usable form of energy;
wherein there is provided an extension surface oriented parallel to the lower portion of the working surface at the outer end thereof to project downwardly and forwardly from the working surface, the extension surface being supported on the anchor in fixed relationship therewith for sliding movement relative to the working surface.

38. A wave energy device for capturing heave forces and surge forces of waves propagating in a wave direction in which the device faces forwardly to confront the waves propagating in the wave direction, the device comprising:
   a buoyant body for tracking a rise and fall of the waves;
   a working surface for facing forwardly to confront the waves and being coupled to the buoyant body for movement together therewith, the working surface including an upper portion and a lower portion for capturing a substantial portion of the surge forces in the wave direction and the heave forces of the waves between the upper and lower portions of the working surface;
   the lower portion of the working surface extending from an inner end to an outer end in which the outer end of the lower portion is spaced forwardly and downwardly in relation to the inner end of the lower portion;
   the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;
   an anchor for being substantially anchored against the rise and fall and the surge forces of the waves; and
   a driven linkage coupling the buoyant body to the anchor for relative movement therebetween and for converting said relative movement into a usable form of energy;
   wherein the buoyant body includes a front wall which is sloped downwardly and rearwardly in the wave direction and a rear wall which is sloped upwardly and rearwardly in the wave direction; and
   wherein there is provided a panel member below the buoyant body which projects upwardly and rearwardly in the wave direction substantially in alignment with the rear wall of the buoyant body, the upper portion of the working surface being defined by the front wall of the housing and the lower portion of the working surface being defined by the panel member.

39. A wave energy device for capturing heave forces and surge forces of waves propagating in a wave direction in which the device faces forwardly to confront the waves propagating in the wave direction, the device comprising:
   a buoyant body for tracking a rise and fall of the waves;
   a working surface for facing forwardly to confront the waves and being coupled to the buoyant body for movement together therewith, the working surface including an upper portion and a lower portion for capturing a substantial portion of the surge forces in the wave direction and the heave forces of the waves between the upper and lower portions of the working surface;
   the lower portion of the working surface extending from an inner end to an outer end in which the outer end of the lower portion is spaced forwardly and downwardly in relation to the inner end of the lower portion;
   the upper portion of the working surface extending from an inner end to an outer end in which the outer end of the upper portion is spaced forwardly in relation to the inner end of both the upper and the lower portions and in which the outer end of the upper portion is spaced above the outer end of the lower portion;
   an anchor for being substantially anchored against the rise and fall and the surge forces of the waves; and
   a driven linkage coupling the buoyant body to the anchor for relative movement therebetween and for converting said relative movement into a usable form of energy;
   wherein connection of the driven linkage with at least one of the buoyant body and the anchor is selectively releasable for releasing the buoyant body from a working position to a transport position.

40. The device according to claim 39 wherein one of the buoyant body and the anchor includes a first connector and the driven linkage includes a second connector for mating connection with the first connector and wherein there is provided a tow cable coupled at a first end to one of the first or second connectors, the tow cable extending about a pulley supported on the other one of the first and second connectors such that pulling on a second end of the tow cable draws the first end of the tow cable towards the pulley and thus draws the first and second connectors together to reconnect the buoyant body in the working position.

41. The device according to claim 39 wherein there is provided a variable ballast on the buoyant body which is operable to increase buoyancy of the buoyant body in the transport position in relation to the working position.

42. The device according to claim 39 wherein the buoyant body is rotated and the working surface is displaced upwardly as the buoyant body is displaced from the working position to the transport position.

43. The device according to claim 39 wherein the variable ballast increases buoyancy responsive to displacement of the buoyant body into the transport position.

44. The device according to claim 43 wherein the buoyant body is rotated into the transport position by buoyant members when the buoyant body is released from the anchor.

45. The device according to claim 43 wherein the buoyant body includes a rear surface opposite the working surface which is sloped upwardly in the wave direction for rotating the buoyant body into the transport position by displacing the buoyant body in the wave direction along a water surface.

46. The device according to claim 43 wherein the variable ballast comprises a ballast chamber which receives water therein as ballast in the working position and drainage ports which automatically drain the water from the ballast chamber when the buoyant body is displaced from the working position to the transport position.

47. A wave energy device for capturing heave forces of waves propagating in a wave direction, the device comprising:
   a buoyant body for tracking a rise and fall of the waves responsive to the heave forces of the waves;
   an anchor for being substantially anchored against the rise and fall of the waves;
   a driven linkage coupling the buoyant body to the anchor for relative movement therebetween and for converting said relative movement into a usable form of energy;
   connection of the driven linkage with at least one of the buoyant body and the anchor being selectively releasable for releasing the buoyant body from a working position into a transport position; and
   a variable ballast on the buoyant body operable to increase buoyancy of the buoyant body in the transport position in relation to the working position.

48. The device according to claim 47 wherein the buoyant body is rotated as the buoyant body is displaced from the working position to the transport position.

49. The device according to claim 47 wherein the variable ballast increases buoyancy responsive to displacement of the buoyant body into the transport position.

50. The device according to claim 49 wherein there is provided buoyant members on the buoyant body arranged to rotate the buoyant body into the transport position when the buoyant body is released from the anchor.

51. The device according to claim 49 wherein the buoyant body includes a rear surface opposite the working surface which is sloped upwardly in the wave direction in the working position for rotating the buoyant body into the transport position when the buoyant body is displaced along a water surface in the wave direction.

52. The device according to claim 47 wherein the variable ballast comprises a ballast chamber which receives water therein as ballast in the working position and drainage ports on the ballast chamber which automatically drain the water from the ballast chamber when the buoyant body is displaced from the working position to the transport position.

53. The device according to claim 47 wherein a rear side of the buoyant body opposite the working surface is suitably shaped for reduced drag when towed across a surface of a body of water.

54. The device according to claim 47 wherein a rear side of the buoyant body opposite the working surface includes pontoons attached thereto having a longitudinal axis extending generally in the wave direction.

55. The device according to claim 47 wherein a rear side of the buoyant body opposite the working surface includes a tow cable attachment thereon for connection of the rear side of the buoyant body to a tow cable.

56. The device according to claim 47 wherein a rear side of the buoyant body opposite the working surface includes rolling members for supporting the buoyant body for rolling movement along the ground.

57. The device according to claim 47 wherein the variable ballast comprises a ballast chamber for receiving water as ballast therein in which a working volume of the ballast chamber is adjustable to adjust buoyancy of the buoyant body.

58. The device according to claim 57 wherein there is provided at least one drainage port in the ballast chamber which drains water out of the ballast chamber, the working volume of the ballast chamber being adjustable by adjusting elevation of said at least one drainage port in relation to the ballast chamber.

59. The device according to claim 47 wherein one of the buoyant body and the anchor includes a first connector and the driven linkage includes a second connector for mating connection with the first connector and wherein there is provided a tow cable coupled at a first end to one of the first or second connectors, the tow cable extending about a pulley supported on the other one of the first and second connectors such that pulling on a second end of the tow cable draws the first end of the tow cable towards the pulley and thus draws the first and second connectors together to reconnect the buoyant body in the working position.

* * * * *